(12) United States Patent
Kim et al.

(10) Patent No.: US 11,852,183 B2
(45) Date of Patent: Dec. 26, 2023

(54) PRESS-FIT NUT FOR ASSEMBLY, PRESS-FIT NUT-BOLT ASSEMBLY, AND METHOD OF CONSTRUCTING STEEL-CONCRETE COMPOSITE STRUCTURE USING SAME

(71) Applicant: GAURIAN CO., LTD., Goyang-si (KR)

(72) Inventors: Dong Joon Kim, Goyang-si (KR); Koo Yun Park, Seoul (KR); Joo Ho Jin, Paju-si (KR); Hee Sun Seo, Goyang-si (KR)

( * ) Notice: Subject to any disclaimer, the term of this patent is extended or adjusted under 35 U.S.C. 154(b) by 371 days.

(21) Appl. No.: 17/290,738

(22) PCT Filed: Sep. 17, 2020

(86) PCT No.: PCT/KR2020/012570
§ 371 (c)(1),
(2) Date: Apr. 30, 2021

(87) PCT Pub. No.: WO2021/054744
PCT Pub. Date: Mar. 25, 2021

(65) Prior Publication Data
US 2022/0003259 A1 Jan. 6, 2022

(30) Foreign Application Priority Data

Sep. 17, 2019 (KR) .................. 10-2019-0113932
Sep. 17, 2019 (KR) .................. 10-2019-0113933

(51) Int. Cl.
*F16B 37/04* (2006.01)
*E04B 1/24* (2006.01)
(Continued)

(52) U.S. Cl.
CPC ............ *F16B 37/04* (2013.01); *E04B 1/2403* (2013.01); *E04B 1/41* (2013.01); *F16B 5/0208* (2013.01);
(Continued)

(58) Field of Classification Search
CPC ...... F16B 5/0208; F16B 33/002; F16B 35/04; F16B 37/00; F16B 37/04; F16B 37/044;
(Continued)

(56) References Cited

U.S. PATENT DOCUMENTS 2,544,304 A * 3/1951 Eckenbeck ............. F16B 37/06
411/968
5,031,487 A * 7/1991 Polonsky ................ B25B 27/18
81/53.2

(Continued)

FOREIGN PATENT DOCUMENTS

CN 207583806 U 7/2018
JP S51-147856 U 11/1976
(Continued)

OTHER PUBLICATIONS

International Search Report for PCT/KR2020/012570 dated Dec. 15, 2020.

*Primary Examiner* — Roberta S Delisle

(57) ABSTRACT

The present invention relates to a press-fit nut for an assembly, a press-fit nut-bolt assembly, and a method of constructing a steel-concrete composite structure using same, wherein a process is simple and a base material does not become deformed during an installation process. The press-fit nut-bolt assembly of the present invention includes a press-fit nut, a stud bolt, a counter nut, and a washer. The press-fit nut includes: a head part formed in a typical nut shape; and a press-fitting part that is formed extending from one of the two surfaces of the head part so as to have an outer diameter less than that of the head part, and that is inserted, through press-fitting, into a base material (M) that is an object requiring fastening. A hollow having threads is continuously formed in the head part and the press-fitting part. The stud bolt includes a body part that is coupled to the press-fit nut by passing therethrough, and a pin tail which is
(Continued)

formed extending from an end of the body part and to which a mechanism for rotating the body part is coupled. The body part includes a first threaded portion and a second threaded portion which are formed on the outer surface of the body part along the lengthwise direction of the body part and spaced apart from each other.

12 Claims, 25 Drawing Sheets

(51) Int. Cl.
  *E04B 1/41* (2006.01)
  *F16B 5/02* (2006.01)
  *F16B 35/04* (2006.01)
(52) U.S. Cl.
  CPC ...... *F16B 35/04* (2013.01); *E04B 2001/2418* (2013.01)
(58) Field of Classification Search
  CPC ...... F16B 37/045; F16B 37/048; F16B 37/06; F16B 37/061; F16B 37/065; F16B 37/068; F16B 39/00; E04B 1/2403; E04B 1/41; E04B 2001/2418
  USPC ............... 411/166, 171–174, 177, 179, 181
  See application file for complete search history.

(56) References Cited

U.S. PATENT DOCUMENTS

| | | | |
|---|---|---|---|
| 5,209,621 A * | 5/1993 | Burbidge | F16B 13/0808 411/546 |
| 5,655,431 A * | 8/1997 | Pierce | F16B 39/026 411/4 |
| 8,096,743 B2 * | 1/2012 | Babej | F16B 37/068 411/188 |
| 8,622,672 B2 * | 1/2014 | Babej | F16B 37/068 411/179 |
| 9,839,995 B2 * | 12/2017 | Kovach | B25B 13/48 |
| 2006/0291974 A1 * | 12/2006 | McGee | B25B 27/0014 411/171 |
| 2008/0145176 A1 * | 6/2008 | Babej | F16B 37/065 411/179 |
| 2008/0187408 A1 * | 8/2008 | Babej | B21H 7/00 411/181 |
| 2010/0129173 A1 * | 5/2010 | Babej | F16B 37/065 411/173 |
| 2016/0215808 A1 | 7/2016 | Brewer et al. | |

FOREIGN PATENT DOCUMENTS

| | | |
|---|---|---|
| JP | S59-155011 A | 9/1984 |
| JP | S63-089414 U | 6/1988 |
| JP | S63-89414 U | 6/1988 |
| JP | H02-036613 U | 3/1990 |
| JP | 14-32309 U | 3/1992 |
| JP | H04-032309 U | 3/1992 |
| JP | 2003-254314 A | 9/2003 |
| JP | 2010-048308 A | 3/2010 |
| JP | 2016-121800 A | 7/2016 |
| KR | 20-0250950 Y1 | 11/2001 |
| KR | 20-0289055 Y1 | 9/2002 |
| KR | 10-2015-0005285 A | 1/2015 |
| KR | 10-2016-0078046 A | 7/2016 |

* cited by examiner (a)

(b)

(a)

(b)

(a)

(b)

PRESS-FIT NUT FOR ASSEMBLY, PRESS-FIT NUT-BOLT ASSEMBLY, AND METHOD OF CONSTRUCTING STEEL-CONCRETE COMPOSITE STRUCTURE USING SAME

TECHNICAL FIELD

The present invention generally relates to a press-fit nut for assembly, a press-fit nut-bolt assembly, and a construction method of steel-concrete composite structure using the same, more particularly to a press-fit nut for assembly, a press-fit nut-bolt assembly, and a construction method of steel-concrete composite structure using the same, whose process is simple and which do not create deformation during the installation process on the base material.

BACKGROUND ART

A Press-fit nut is also referred to as so-called a pem nut, a clinching nut, or a one-way nut. A press-fit nut is used when it is difficult to fasten a bolt and a nut at the same time or when it is difficult for a technician to reach a nut to fasten it. Especially, when a plate-shaped member is a base material, it is necessary to install bolts and nuts. At that moment, only one side of the base material is reachable while the other side of it has already been joined or is facing toward an unreachable location for the technician. In this case, the press-fit nuts are press-fitted into the base material in advance either before bolts and nuts are installed on the base material or when the base material is still reachable.

A normal nut can be welded on the base material M in advance, but welding may create brittle fracture (earthquake, vibration) because of changes in the material caused by its welding heat, and its welding quality heavily depends on the skill of the technician. In addition, welding has problems such as injury, danger, restriction of construction due to environment, $CO_2$ generation, and fire.

Therefore, a nut having a press-fitting part 2 as shown in FIG. 1 has been developed so that the nut can be installed by a press-fit method using plastic deformation when the base material is a metal or such a material capable of plastic deformation like metal. Such a nut is referred to as a press-fit nut 1 or a one-way nut (hereinafter, referred to as a press-fit nut 1).

The press-fit nut is first press-fitted to the inside the steel plate. Subsequently, a one-way bolt, a high tension washer, and a high tension nut are temporarily assembled. However, when the inner socket fixes a pin tail and the outer socket rotates a high tension nut in a share wrench, the pin tail may be broken due to torsion.

In general, since ridges of the press-fit nut and the ridges of the high tension nut are both made in the same direction during the fastening process, the press-fit nut is first fixed and then the high tension nut is to be tightened to fasten. So, it is very inconvenient to work. Therefore, it has been necessary to develop the technology to improve its structure so that both the press-fit nut and the high-tension nut can be fastened with one single tightening operation.

As shown in FIG. 1, the press-fit nut has blade-shaped splines which are formed densely in the press-fit direction along the side of its press-fit part, so that the press-fit nut cannot be moved at all while a bolt is later being fastened once the press-fit nut was installed. The splines strongly resist the change in the direction of rotation, but do not resist at all in the direction in which the press-fit nut is pulled out.

The press-fit nut has problems such as its rapid plastic deformation and the brittle fracture of the base material due to the strong impact made when it is press-fitted into the base material. Press-fit nuts are widely used owing to their convenience and innovation, but they still need to be improved in their technology because of their above-mentioned problems at both their installation process and their maintenance of their solidity installation. Such technical improvement of them is more urgently required when considering the safety of the facility.

As shown in FIG. 12, the part of the base material where the press-fit nut is press-fitted is expanded and deformed in the direction of its thickness as much as the portion of the press-fit nut that is press-fitted into the base material while the part of the base material where the press-fit nut is not press-fitted is not expanded. So, the base material is bent in the way that the surface of the side of the base material where the press-fit nut is press-fitted is expanded to be deformed and the surface of the side of the base material where the press-fit nut is not press-fitted is curved.

DOCUMENTS OF RELATED ART

Korea Utility Model Publication No. 20-0250950 (published date: Nov. 17, 2021)

DISCLOSURE

Technical Problem

The present invention provides a press-fit nut-bolt assembly, a method of constructing a steel-concrete composite structure using the same, and a press-fit nut for the assembly, so that the installation process is more convenient and the base material is not deformed and the stability of the steel-concrete composite structure is increased in installation of a press-fit nut-bolt assembly in construction field.

Technical Solution

In an embodiment of the present invention, a press-fit nut-bolt assembly has a press-fit nut, a stud bolt, a counter nut, and a washer, wherein the press-fit nut comprises: a head part famed in a normal nut shape; and a press-fit part formed to extend from one of both sides of the head part and having an outer diameter of the head part reduced as it extends, and is inserted by press-fitting into a base material M which requires fastening, wherein the head part and the press-fit part have a hollow with ridges continuously formed therein, wherein the stud bolt includes: a body part penetrating the press-fit nut so as to be coupled with the press-fit nut; and a pin tail formed to extend from the end of the body part and coupled with a mechanism for rotating the body part, wherein the body part includes a first ridge part and a second ridge part which are formed on an outer surface of the body part along the length direction of the body part and formed to be spaced apart from each other, wherein the counter nut is disposed on the opposite side of the press-fit nut with the base material therebetween which the stud bolt penetrates so that the stud bolt penetrates the counter nut so as to be coupled with the counter nut, wherein the washer is disposed between the base material and the counter nut, and the stud bolt penetrate its center, wherein the pin tail is formed at an end of the second ridge part which is one of both ends of the body part, so that the press-fit nut is coupled with the first ridge part and the counter nut is coupled to the second ridge part, and the first ridge part and the second ridge part are opposite to each other in directions of their ridges.

Preferably, in another embodiment of the present invention, a method for constructing a steel-concrete composite structure using the press-fit nut-bolt assembly of the above embodiment includes steps of: perforating so as to insert the stud bolt into the steel material; press-fitting the press-fit nut so as to form a concentric circle with a hole formed by the perforation in the area where the perforation is made on a surface of the steel material to be bonded to concrete; installing the stud bolt, the counter nut, and the washer to the press-fit nut; pouring the concrete on the surface to be bonded; and adjusting the installation position of the stud bolt before curing the concrete so as to maximize the length of one of the first surplus section and the second surplus section, which is buried in the concrete, wherein there is no temporal precedence between the step of pouring concrete and the step of adjusting to maximize the length.

Furthermore, in another embodiment of the present invention, a press-fit nut comprises: a head part formed in a normal nut shape such as a polygonal column or a circular column, and having ridges on an inner surface of a hollow that penetrates between both sides thereof; and a press-fit part extending from one of both sides of the head part with decreasing in diameter, wherein the press-fit part has: a hollow at a center of the press-fit part, which continues to the hollow of the head part; and plate-shaped splines on a circumferential side of the press-fit part, which are aligned parallel in the protruding direction and closely to each other with predetermined interval, wherein the press-fit part includes: a front sector which is a portion between an end and a certain point; and a rear sector which is a portion between the certain point and a point in contact with the head part, wherein the splines are formed continuously in length direction from the front sector to the rear sector, wherein the front sector decreases in its diameter from a boundary with the front sector and the rear sector to an end of the front sector, and converges toward its center.

Advantageous Effects

According to a press-fit nut-bolt assembly, a method of constructing a steel-concrete composite structure using the same, and a press-fit nut for the assembly of the embodiment described in the present specification, bolts are fastened easily and a stud bolt is fastened strongly as if a head was installed. And, the base material is prevented from bending even if a plurality of press-fitting nuts are installed at the plate-shaped base material. A plurality of nuts fastened at both ends of the stud bolt can be tightened in opposite directions at the same time even if the end of the stud bolt rather than the center of the stud bolt is gripped and rotated. So, the installation process can speed up. The advantage of the press-fit nut-bolt is highlighted as much as possible, and the adhesion between steel and concrete is remarkably enhanced.

BEST MODE

The present invention will be described in detail by the following description based on the accompanying drawings.

Figure 1:
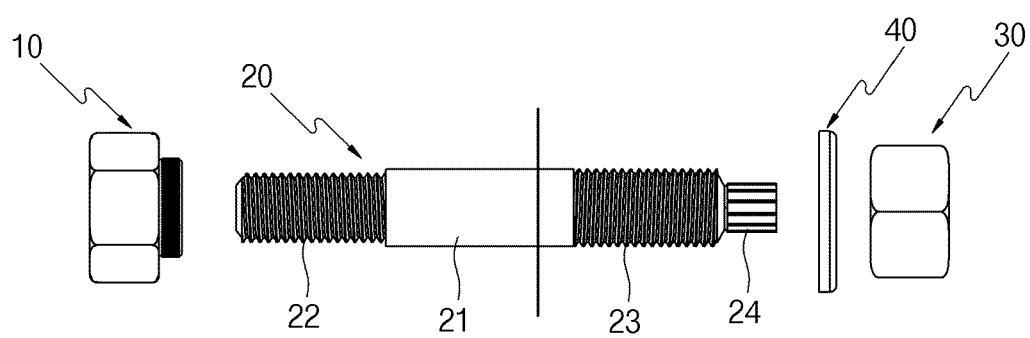
FIG. 1 is a perspective view showing a disassembled press-fit nut-bolt assembly according to an embodiment of the present specification.

As shown in FIG. 1, the fastening mechanism set according to this embodiment is composed of a press-fit nut 10, a stud bolt 20, a counter nut 30, and a washer 40.

Figure 2:
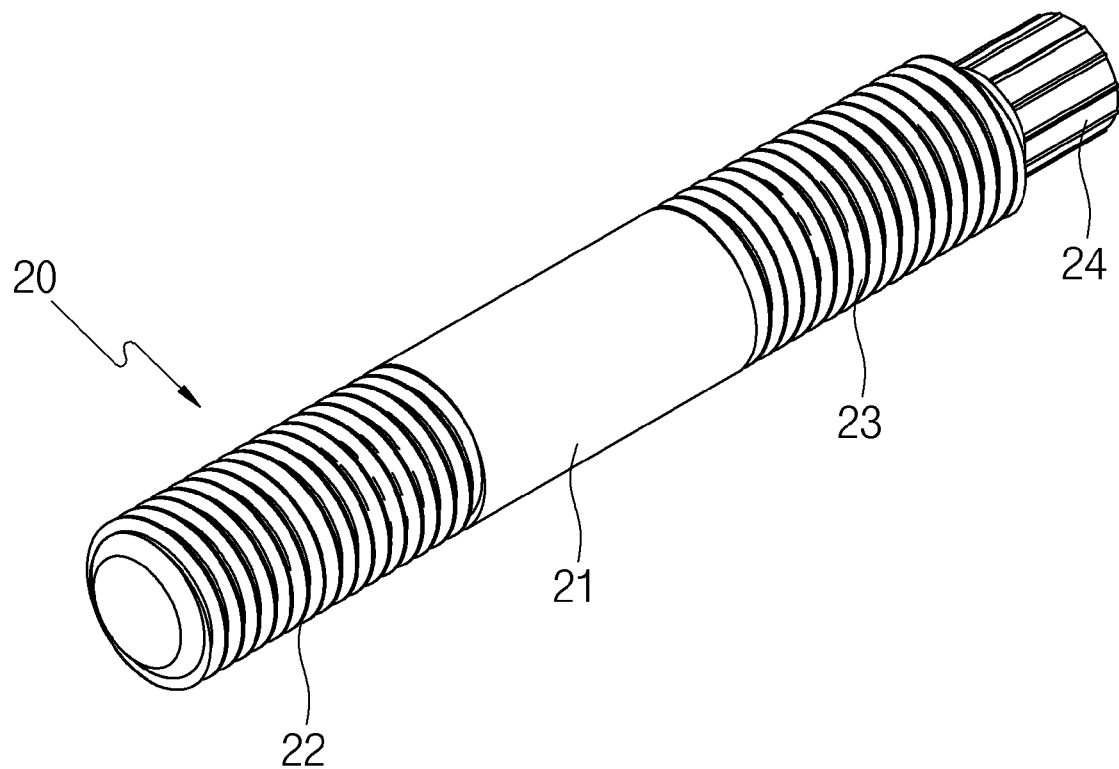
FIG. 2 is a perspective view showing the stud bolt shown in FIG. 1.

The stud bolt 20 is formed to be elongated as shown in FIGS. 1 and 2, and includes a body part 21 penetrating a press-fitting nut 10 to be coupled with it, first and second ridge parts 22 and 23 formed to be spaced apart from each other on the outer surface of the body part 21 along the length direction of the body part 21, and a pin tail 24 formed as extending from the end of the body part 21 and coupled with a mechanism for rotating the body part 21.

Figure 4:
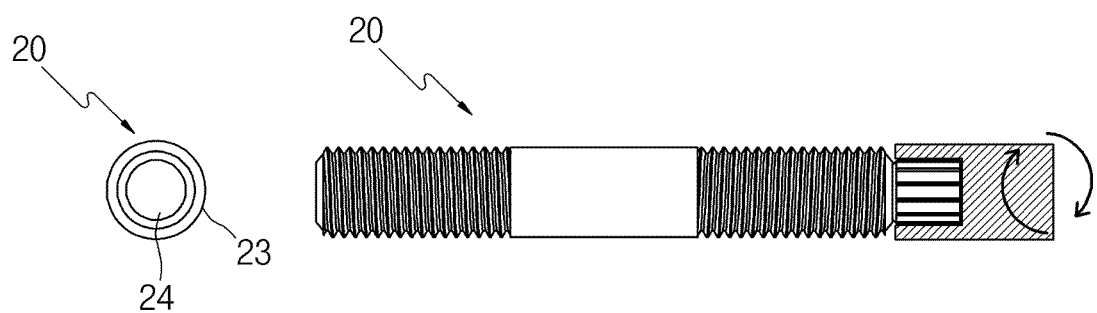
FIG. 4 is a front view showing a conventional pin tail rotated by a conventional tool.
Figure 5:
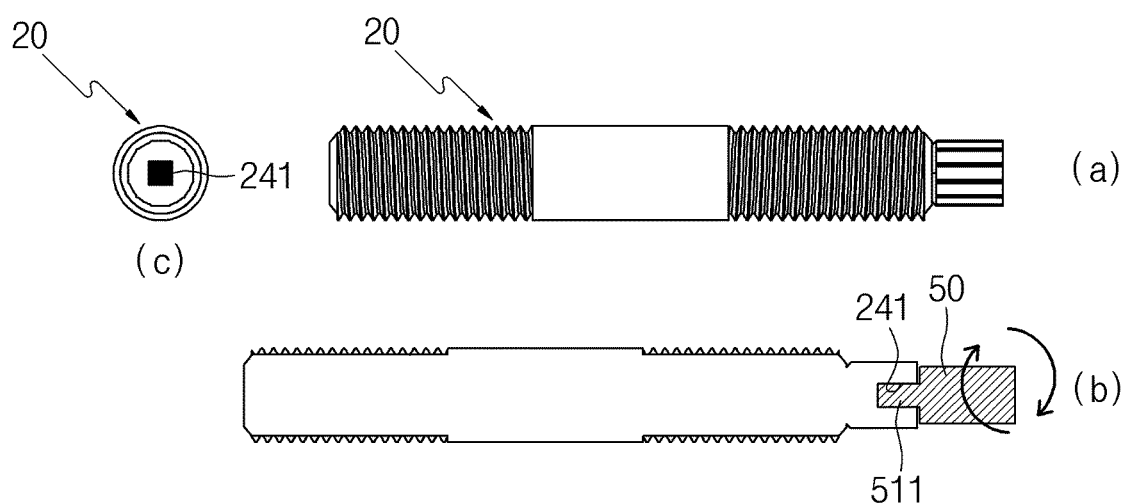
FIGS. 5 and 6 are front views showing two embodiments of a connector member.
Figure 6:
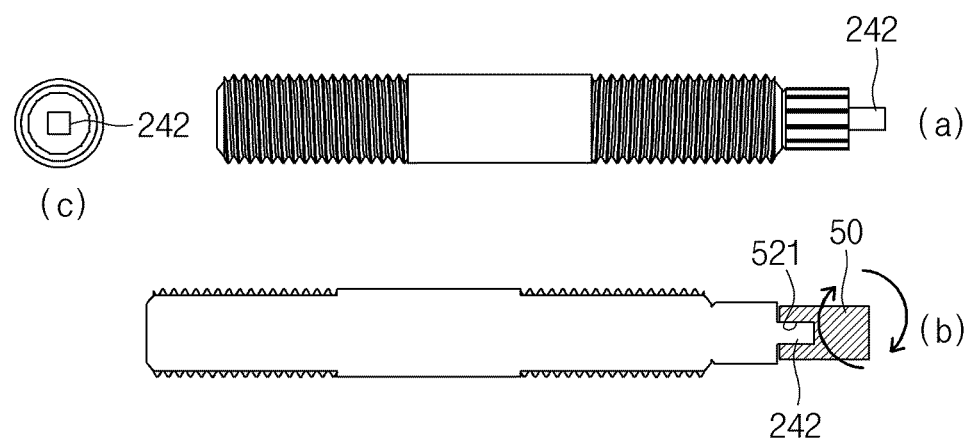

An embodiment of a pin tail is shown in FIGS. 4 to 6.

As shown in FIG. 1, the counter nut 30 has the same shape as a conventional nut, and is disposed on the opposite to the press-fit nut 10 with the base material M interposed therebetween which the stud bolt 20 penetrates. The stud bolt 20 penetrates the counter nut 30 to be coupled with the counter nut 30.

The washer 40 is disposed between the base material M and the counter nut 30 as shown in FIG. 1, and allows the stud bolt 20 to penetrate the center thereof to be coupled therewith. The washer 40 also has the same shape as the conventional washer. The washer 40 makes the coupling between the stud bolt 20 and the base material M more robust by suppressing the relative variation between the base material M and the counter nut 30 as much as possible.

The pin tail 24 is typically formed at the end of the stud bolt so as to grip the stud bolt 20 so that an instrument such as a spanner for rotating a bolt can rotate the stud bolt 20.

Figure 3:
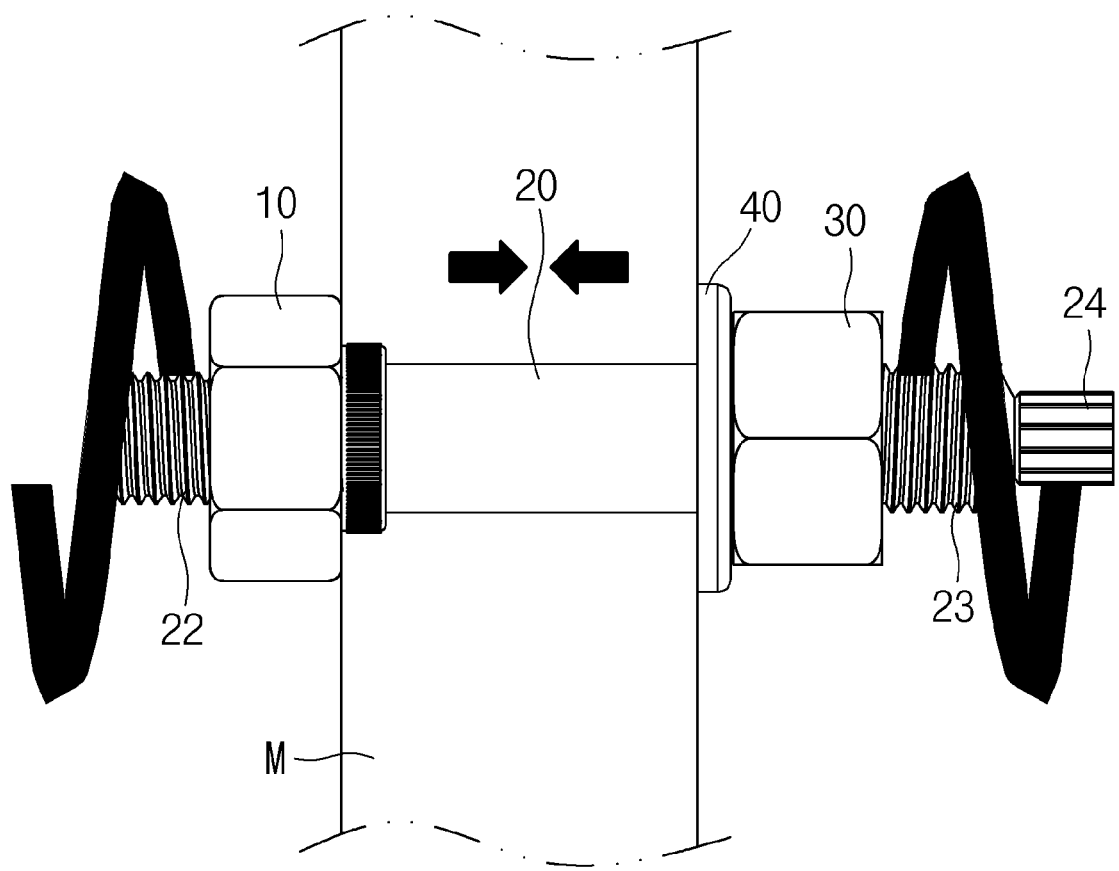
FIG. 3 is a conceptual view showing the usage of an embodiment of the press-fit nut-bolt according to the present invention.

In the embodiment shown in FIGS. 1 to 8, the first and second ridges 22 and 23 formed on the stud bolt 20 are formed in opposite directions to each other. In this case, when fastening and assembling the fastening mechanism set according to the present invention to the base material M as shown in FIG. 3, the press-fit nut 10 and the counter nut 30 installed with the base material M therebetween are each subjected to a force in a direction toward the base material M upon rotating the stud bolt 20 in any direction.

Since the press-fit nut 10 is press-fitted to be fixed on the base material M, the counter nut 30 gets tightened finely penetrating into the base material M if the pin tail 24 is gripped and rotated with a tool when it is finally tightly fastened. So, the counter nut 30, the washer 40, and the base material M are pressed in this order.

Therefore, in the embodiment according to FIGS. 4 to 6, the press-fit nut 10 and the counter nut 30 are moved toward each other at the same time if the pin tail 24 provided on one side of the stud bolt 20 is rotated even if the center of the stud bolt 20 is not held to rotate. So, the two nuts can be fastened at the same time.

However, when the pin tail 24 is directly gripped with a tool and rotated with a strong force, the outer surface of the pin tail 24 may be damaged and it is restricted to elongate the pin tail 24, so that constructability may deteriorate due to interference with surrounding facilities.

Accordingly, a connector member 50 may be further provided in order to improve the constructability, and the connector member 50 may have either the shape shown in FIG. 5 or the shape shown in FIG. 6.

In the first embodiment of the connector 50 shown in FIG. 5, the pin tail 24 has a polygonal pin groove 241 formed at the center of its end surface, and is further provided with a connector member 50 having an assembly pin 511 formed thereon that is a protrusion matching the pin groove 241, so that the outer peripheral surface of the connector member 50 coupled with the pin groove 241 can be gripped and rotated with a tool.

In the second embodiment of the connector 50 shown in FIG. 6, the pin tail 24 has a polygonal protruding pin 242 formed at the center of its end surface, and is further provided with a connector member 50 having an assembly groove 521 formed thereon that is a groove matching the protruding pin 242, so that the outer peripheral surface of the connector member 50 coupled with the protruding pin 242 can be gripped and rotated with a tool.

In the embodiments of FIGS. 5 and 6, two nuts are coupled with one stud bolt 20 at the same time by rotating the connector 50 famed at its side end instead of gripping and rotating the body part 21 which is the center of the stud bolt 20 as in the prior art. Therefore, installation work is easy despite of surrounding facilities that are used to restrict installation.

Figure 7:
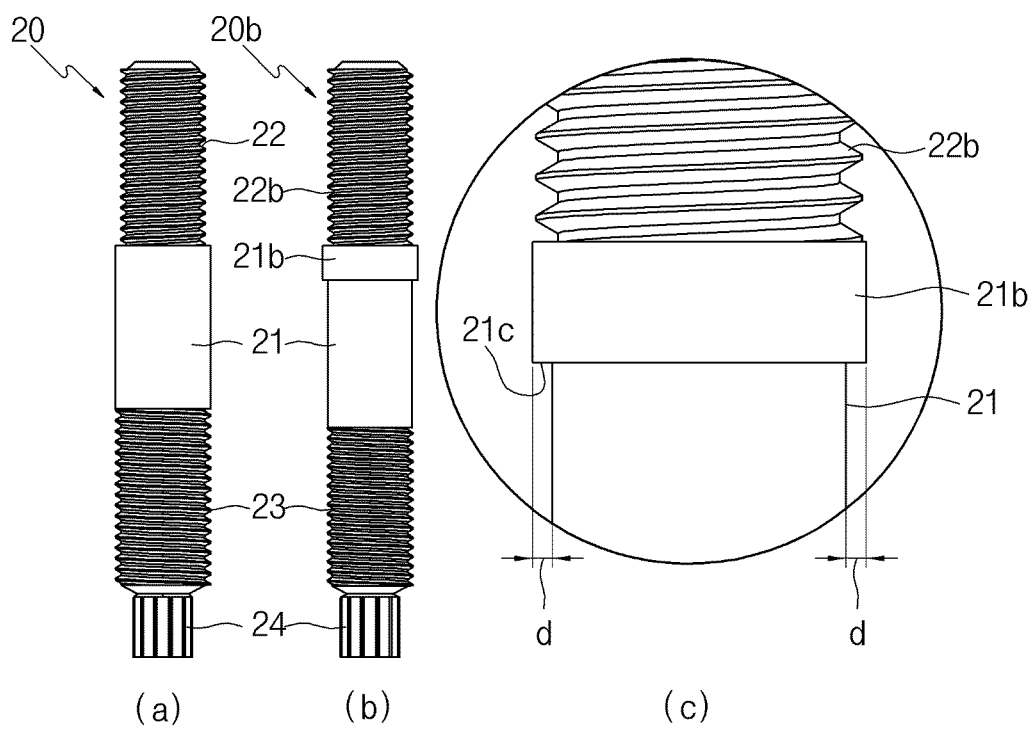
FIGS. 7a to 7c are conceptual views showing the step 21c of the stud bolt.
Figure 8:
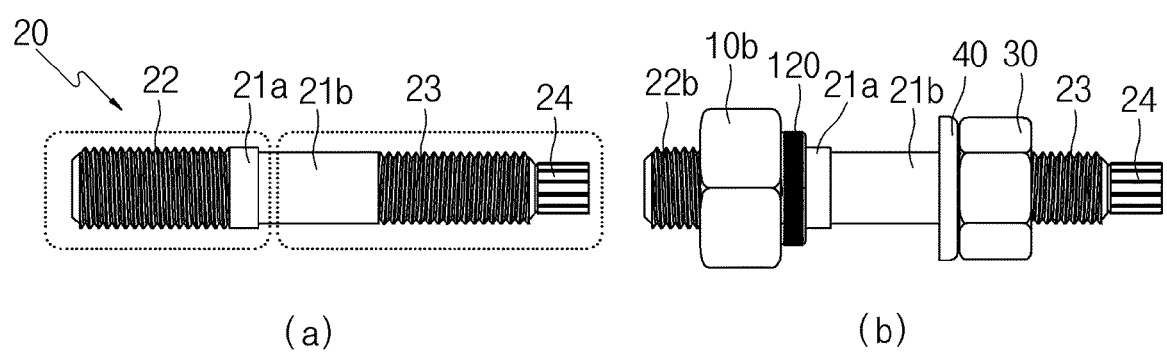
FIGS. 8a, 8b, 9a and 9b are conceptual views showing a supplementary embodiment shown in FIG. 7.
Figure 9:
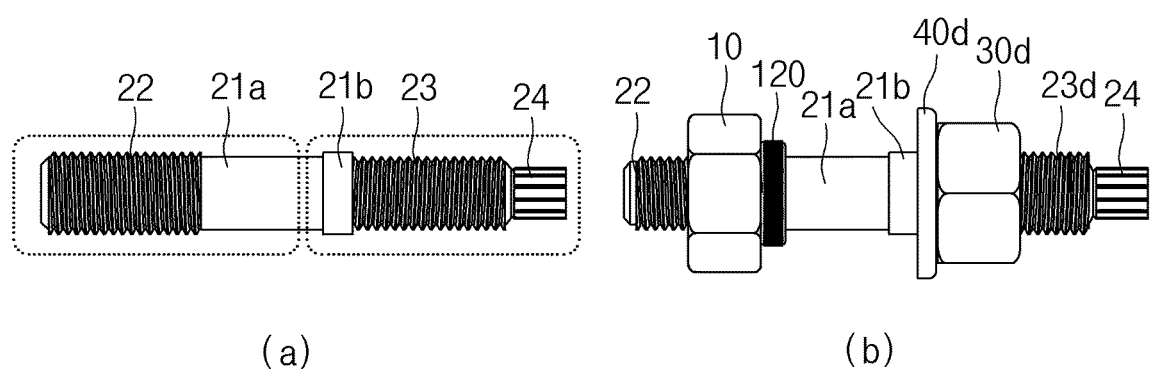

Meanwhile, the press-fit nut-bolt assembly according to the present invention can be made so that the first ridge part 22 may has different diameter from that of the second ridge part 23, as shown in FIGS. 7 to 9.

In particular, the body part 21 may have a step 21c that makes different diameters between both ends of the body part 21, and has first and second ridges 22 and 23 so that the ridge which has larger outer diameter is formed on the end of body part 21 which has larger diameter.

The press-fit nut-bolt assembly is composed in the above-described structure has two effects. First, it is easy to insert the stud bolt 20 if inserting its part that has the smaller diameter in the case that the stud bolt 20 is tried to insert into two base materials M joined together but the end of the stud bolt 20 is caught between the two base materials M.

Second, the stud bolt 20 without the bolt head can have the same performance as a stud bolt with a bolt head.

Both sides of the body part can be divided at the step 21c as shown in FIGS. 7 to 9. Here, the first ridge part 22 of the body part is referred to as first body part 21a and the second ridge part 23 of the body part is referred to as second body part 21b.

When the base materials M are overlapped in two layers and the holes in the overlapping base materials M are slightly shifted from each, it is not easy to insert the stud bolt 20 because the stud bolt 20 is caught by the interface of the base materials M during insertion process. At this time, if the thinner part of the stud bolt 20 that has smaller outer diameter is first inserted as shown in FIG. 8, in other words, if the second ridge part 23 whose diameter is smaller than that of the first ridge part 22 is inserted first into the base materials M, the stud bolt 20 can be easily inserted. It must be noticed that the second ridge part 23 is depicted to have larger diameter in FIG. 7, and the first ridge part 22 is depicted to have larger diameter in FIGS. 8 and 9.

In addition that the step 21c facilitates insertion, a step 21c is formed at the boundary between the first body part 21a and the second body part 21b, so that the step 21c functions as the bolt head. The step 21c prevents the stud bolt 20 from being inserted any longer in the insertion direction once it is installed, so that it is prevented from loosening due to the change in both directions.

Figure 11:
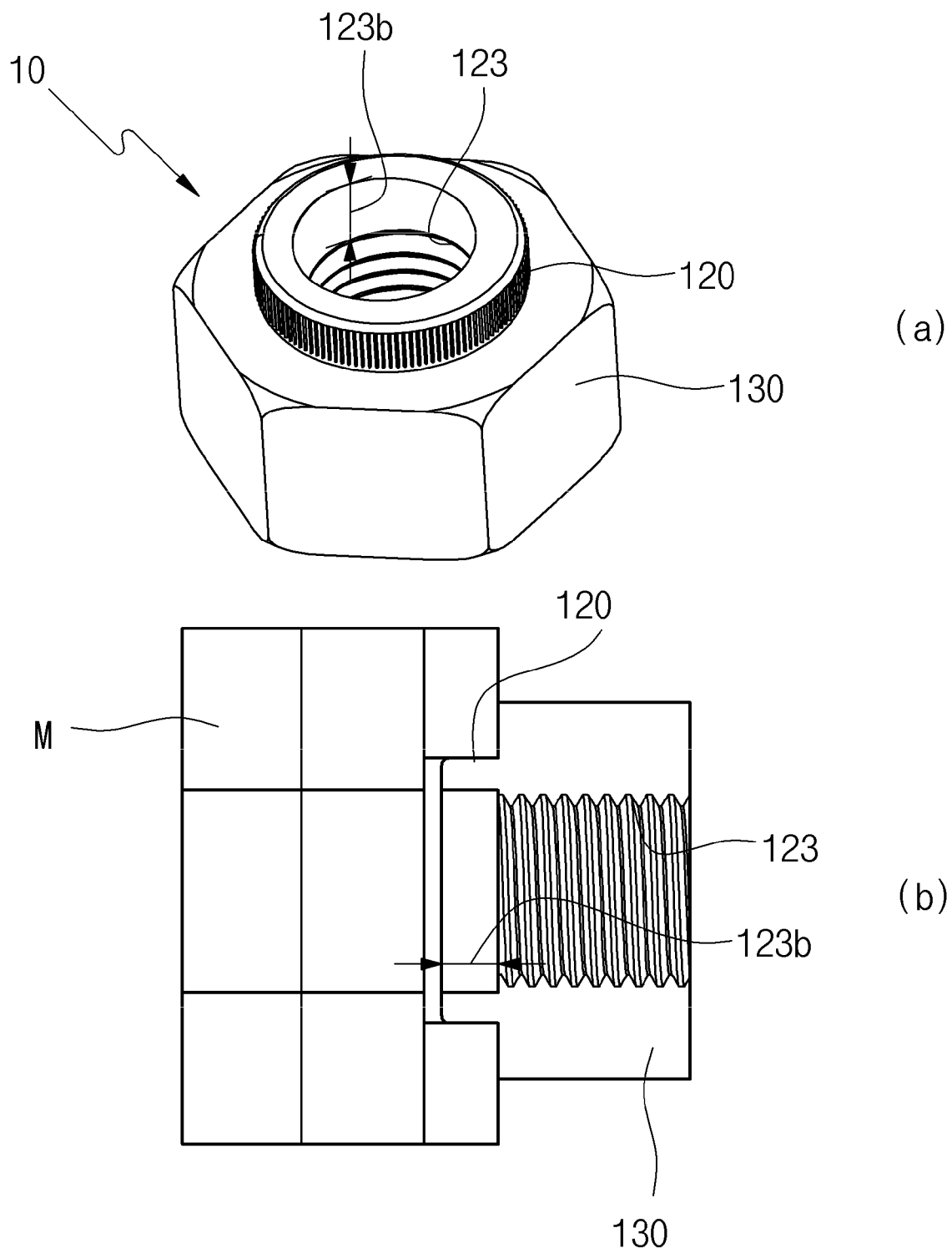
FIGS. 11a and 11b are perspective views showing an embodiment in which the ridges of the conventional press-fit nut shown in FIG. 10 has been partly removed.

On the other hand, as shown in FIGS. 11a and 11b, on the inner surface of the hollow formed in the press-fit nut 10, ridges are famed at the portion corresponding to the inner side of the head part, and no ridges are formed at the portion corresponding to the press-fit part 120.

Figure 10:
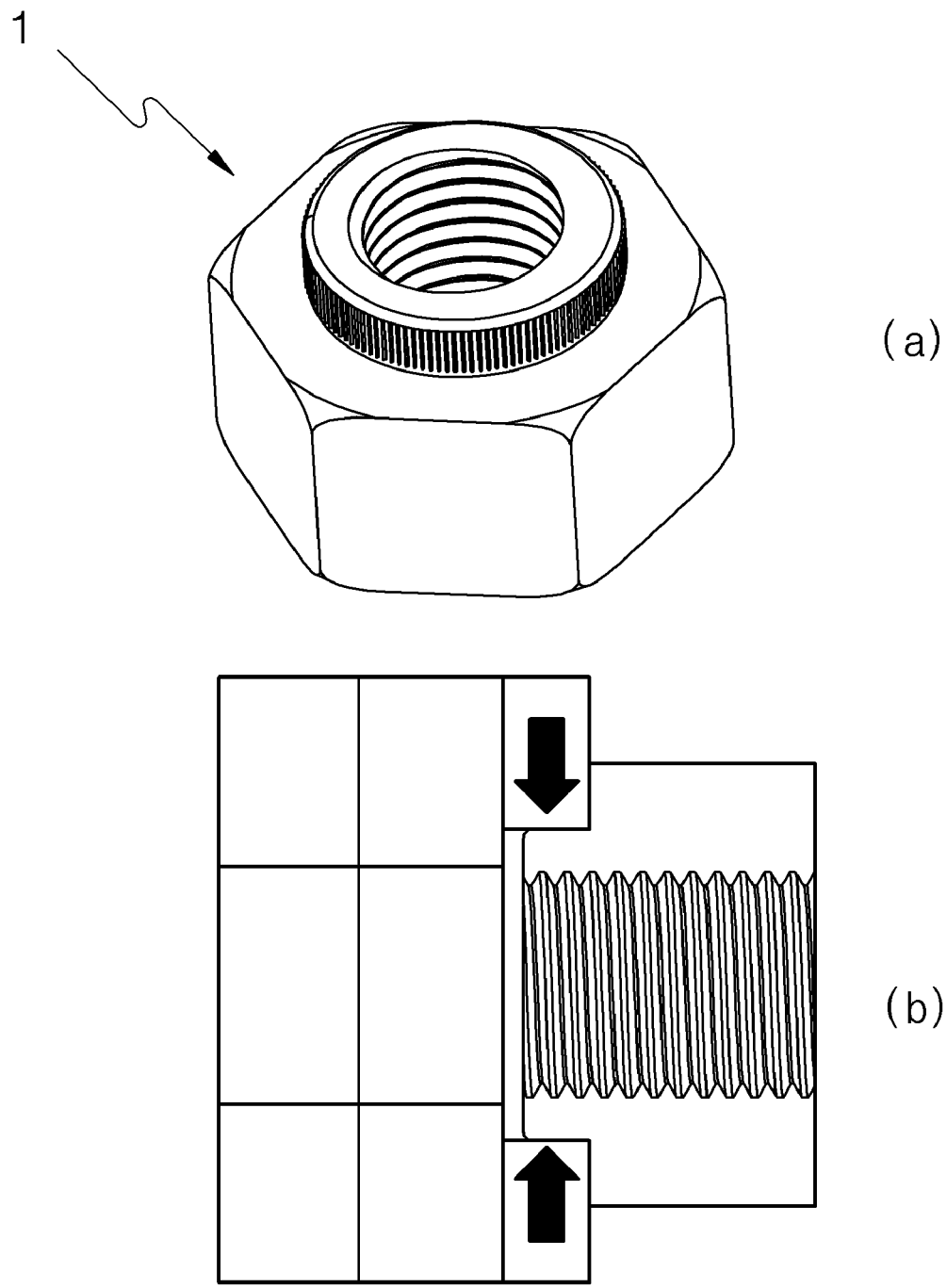
FIGS. 10a and 10b are perspective views showing a conventional press-fit nut.

In the conventional press-fit nut 1, ridges are formed continuously not only in the head part 3 but also in the hollow of the press-fit part 2, as shown in FIGS. 10a and 10b. In this case, during the process of press-fitting the press-fit part 2 into the base material M, the residual stress of the base material M pushed out to the periphery by the press-fit part 2 is directed toward the center of the press-fit part 2, so that the press-fit part 2 may deform the ridges formed in the hollow.

Accordingly, as shown in FIGS. 11a and 11b, the inner surface of the hollow of the press-fit part 2 is formed plain without ridges, so that the bolt can be easily inserted because there is no ridges deformable.

Figure 13:
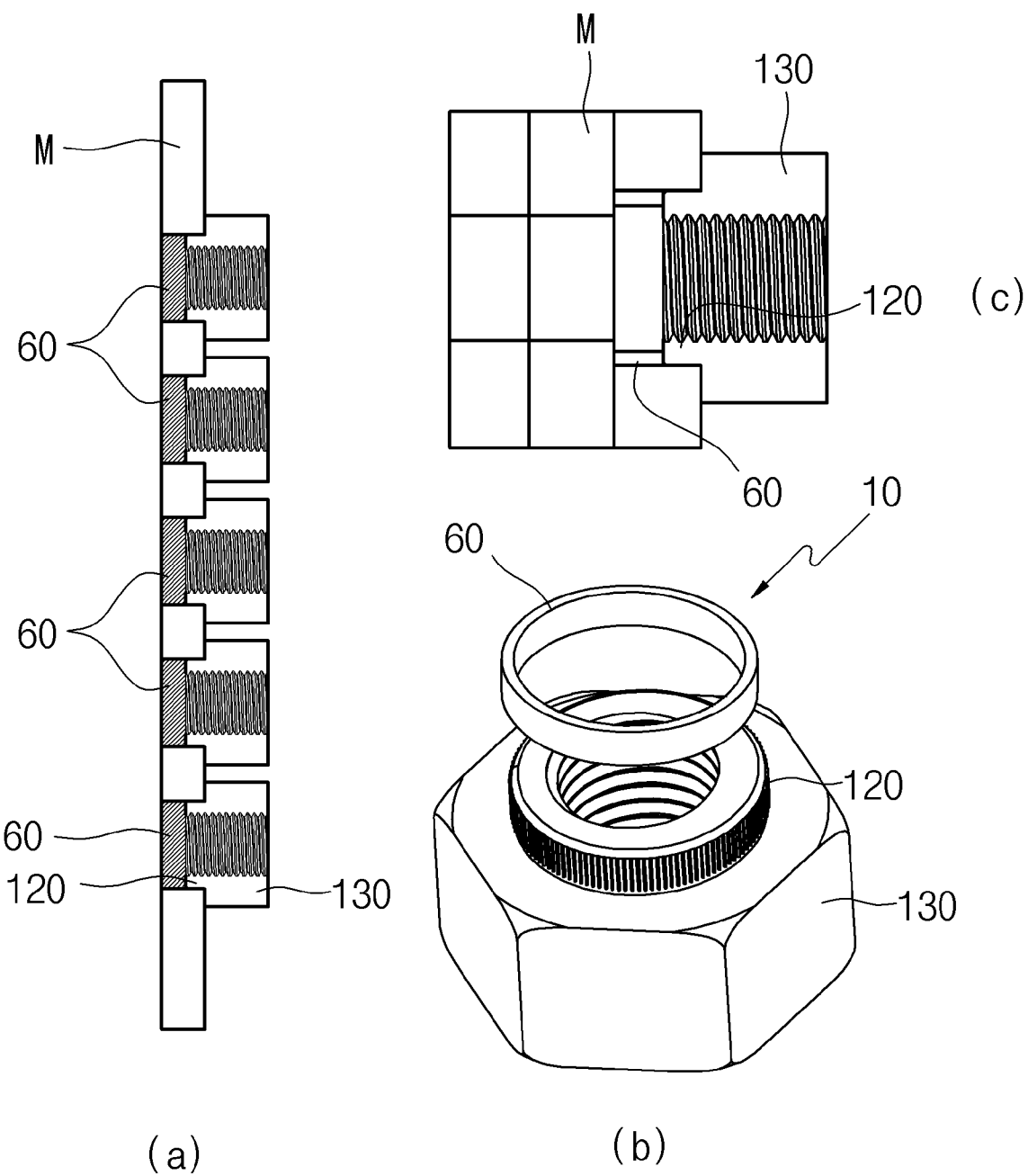
FIGS. 13a to 13c are an installation view, an enlarged cross-sectional view, and a perspective view showing the anti-deformation press-fit ring, respectively.

FIGS. 13a to 13c illustrate an additional construction of a press-fit ring 60.

Figure 12:
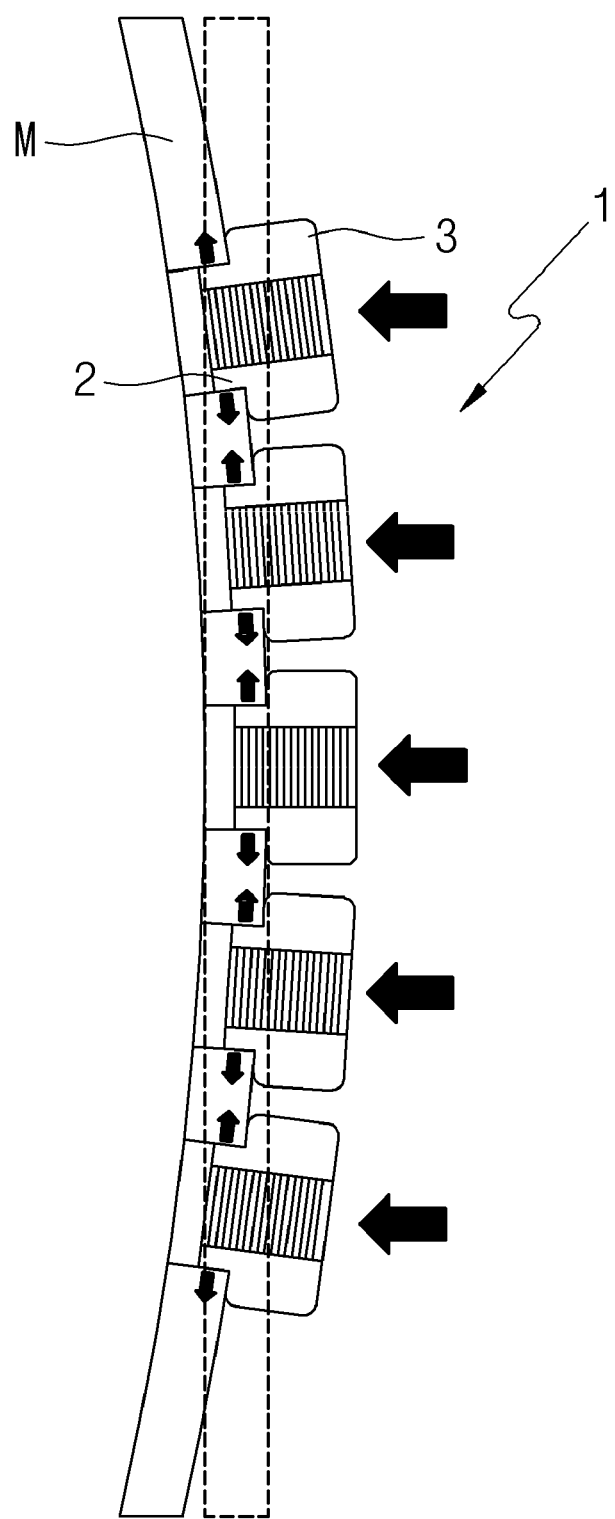
FIG. 12 is a conceptual view showing the deformation of the base material where the conventional press-fitting nuts are installed.

As shown in FIG. 12, it is common that plurality of press-fit nuts 1 rather than one press-fit nut are installed on the base material M. However, as shown in FIG. 12, when several press-fit nuts 1 are installed, the press-fit parts 2 do not completely penetrate the base material M but are inserted into the base material M only by the thickness of the press-fit part 2. Therefore, the base material M is bound to be warped between the portion where the press-fit part 2 is inserted and the portion where the press-fit part 2 is not inserted. This is because the portion where the press-fit part 2 is inserted is expanded by the area of the press-fit part 2 and the portion where the press-fit part 2 is not inserted is curved to be deformed so that stress is created in the direction of the arrow and in front direction in FIG. 12.

The press-fit nut-bolt assembly according to the embodiment shown in FIGS. 13a to 13c further comprises a press-fit ring 60 having the same outer diameter as that of the press-fit part 120 so as to prevent such a problem.

The press-fit ring 60 is a ring-shaped member, and is press-fitted to one side of the base material M, the other side of which the press-fit part is inserted into, so that one side of the base material M is deformed by the amount of deformation of the other side of it deformed by the press-fit part 120. So, the both sides of the base material M are deformed by the same amount of deformation. Therefore, as the press-fit part 120 is press-fitted to the base material M, it prevents the base material M from warping and bending due to excessive deformation of one side of it, so that the stress is uniformly applied over the entire base material M. Accordingly, as shown in FIG. 13a, the base material M is prevented from bending to one side of the base material M, the other side of which the press-fitting nut 10 is press-fitted into, so that bending or distortion can be prevented.

FIGS. 14 to 21 depict other embodiments of the press-fit nut 10.

Figure 14:
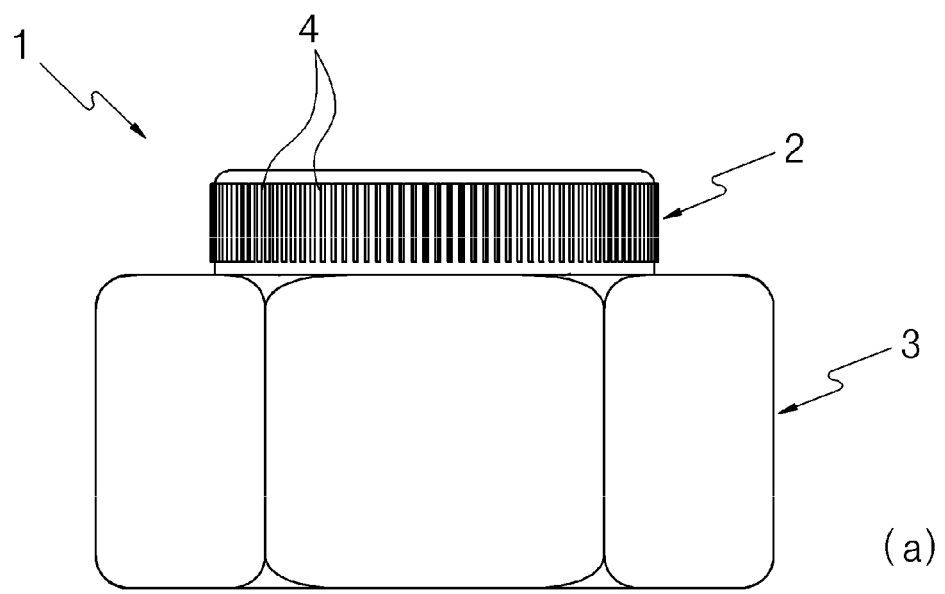
FIGS. 14a and 14b are a front view and a perspective views showing a conventional press-fit nut, respectively.
Figure 14:
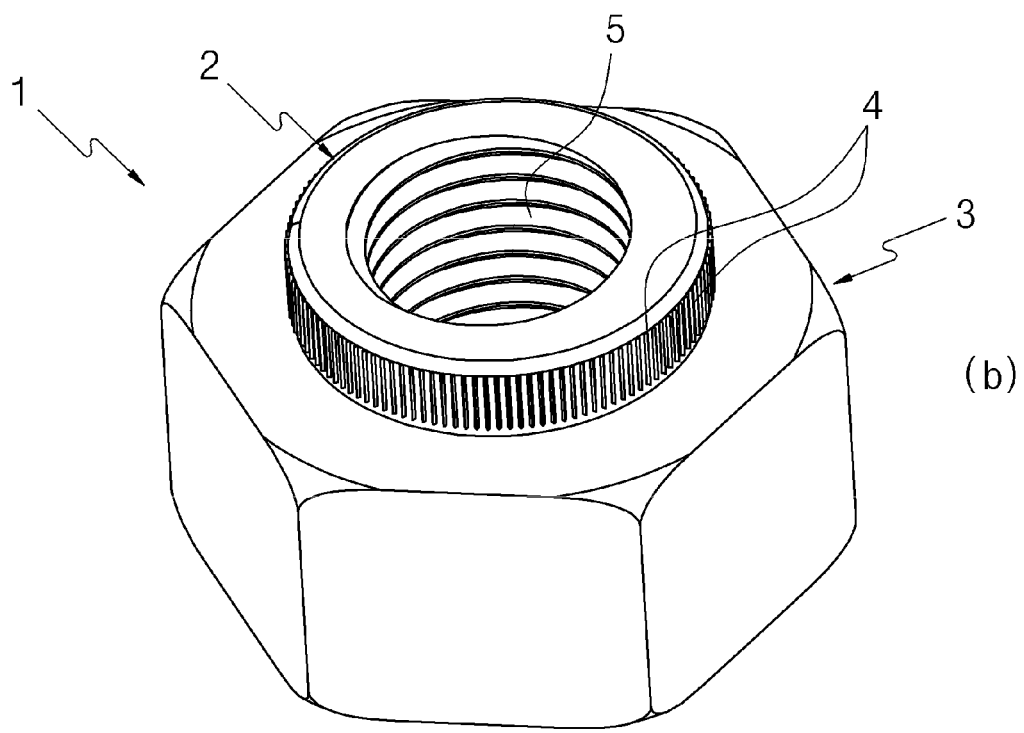

The press-fit nut 10 is composed of a head part 130 and a press-fit part 120 as shown in FIG. 14.

The head part 130 is formed in a normal nut shape such as a polygonal column or a circular column, and is a member having ridges on the inner surface of the hollow 123 that penetrates between both sides of the head part 130. That is, the head part 130 is the same as a normal nut shown in FIGS. 14a and 14b.

The press-fit part 120 is a protrusion part that protrudes with decreasing in diameter from one side of the head part 130. The press-fit part 120 has the hollow 123 at the center of the protrusion part, which continues to the hollow 123 of the head part 130. The press-fit part 120 has plate-shaped splines 124 on its circumferential side, which are aligned parallel in the protruding direction and closely to each other with predetermined interval, so that the press-fit part 120 is press-fitted and inserted into the base material M through which nuts and bolts are required to couple with each other.

Figure 15:
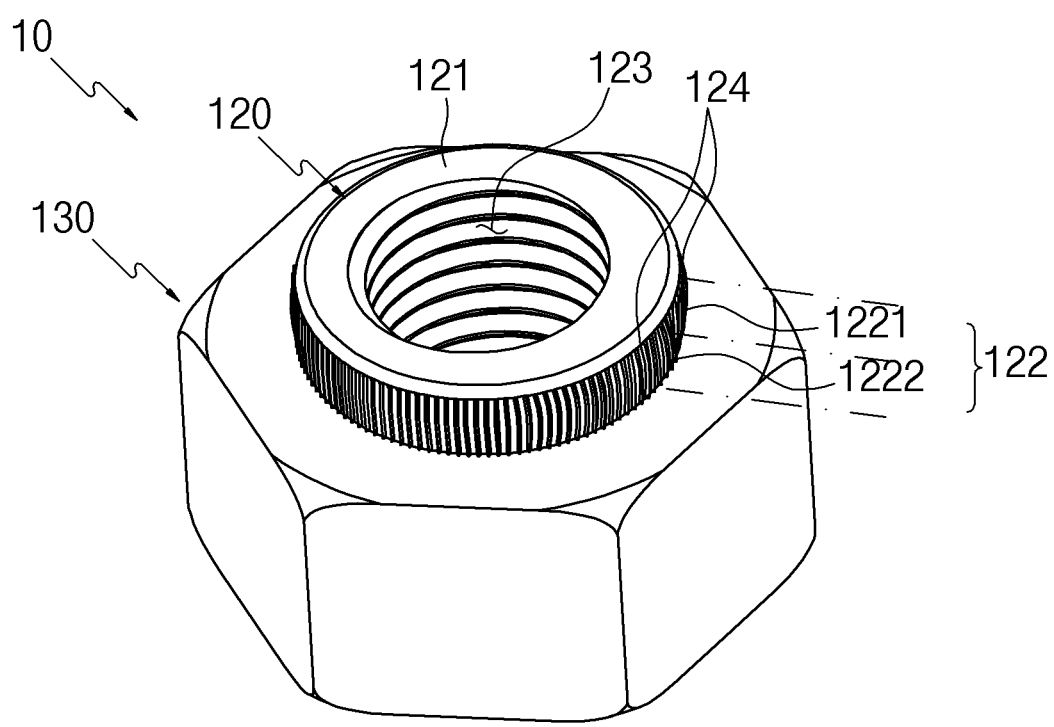
FIG. 15 is a perspective view showing the first embodiment of the press-fit nut.

The press-fit part 120 according to the embodiment shown in FIG. 15 includes a front sector 1221 which is a portion between an end and a certain point, and a rear sector 1222 or 1223 which is a portion between the certain point and a point in contact with the head part 130. The press-fit part 120 itself is a single piece, but in the present invention, the front sector 1221 and the rear sector 1222 or 1223 of the press-fit part 120 act differently from each other and interact with each other at the same time. So, the front sector 1221 and the rear sector 1222 or 1223 are defined to have independent functions from each other in this embodiment.

In particular, the press-fit nut 10 has the front sector 1221 that decreases in diameter as it goes from the boundary with the rear sector 1222 or 1223 to the end of the front sector 1221 and converges toward the center.

Figure 16:
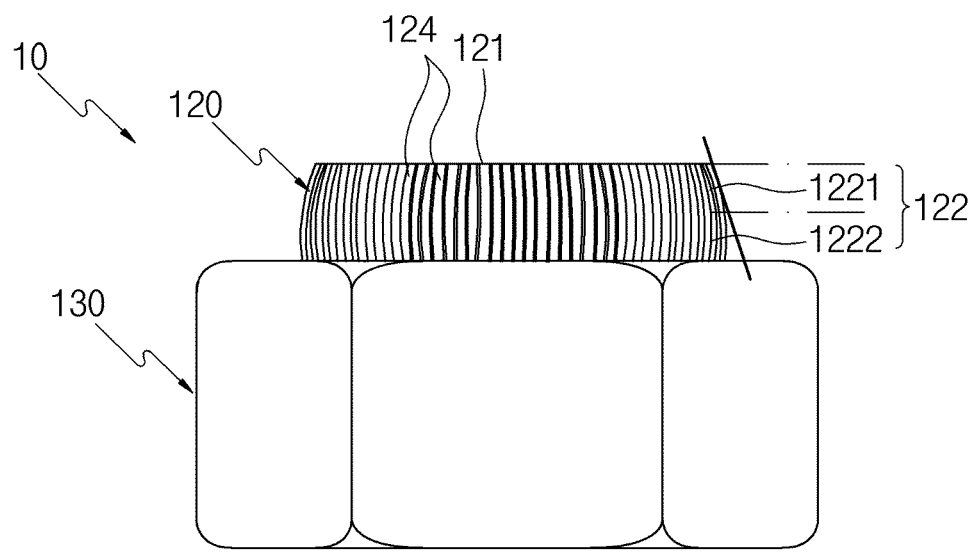
FIG. 16 is a front view showing the first embodiment of the press-fit nut.

Since the front sector 1221 is formed as shown in FIG. 16, the resistance of the base material M is minimized and the plastic deformation of the base material M is also created at its sides when the press-fit part 120 is press-fitted into the base material M. So, when it is finished to press-fit the press-fit part 120, the restoring force (RF) of the base material M is applied to the side of the press-fit part 120, so that the press-fit part 120 can be more solidly installed to the base material M than a conventional press-fitting nut 10.

This means that the clinching nut has the structure that is macroscopically streamlined in the press-fit direction, and has the grooves that is microscopically repeated in a direction perpendicular to the press-fit direction. When the clinching nut of this structure is press-fitted into the base material, the grooves that is microscopically repeated in the perpendicular direction can absorb the deformation force which the structure streamlined in the press-fit direction applies to the base material during the press-fitting process.

Figure 17:
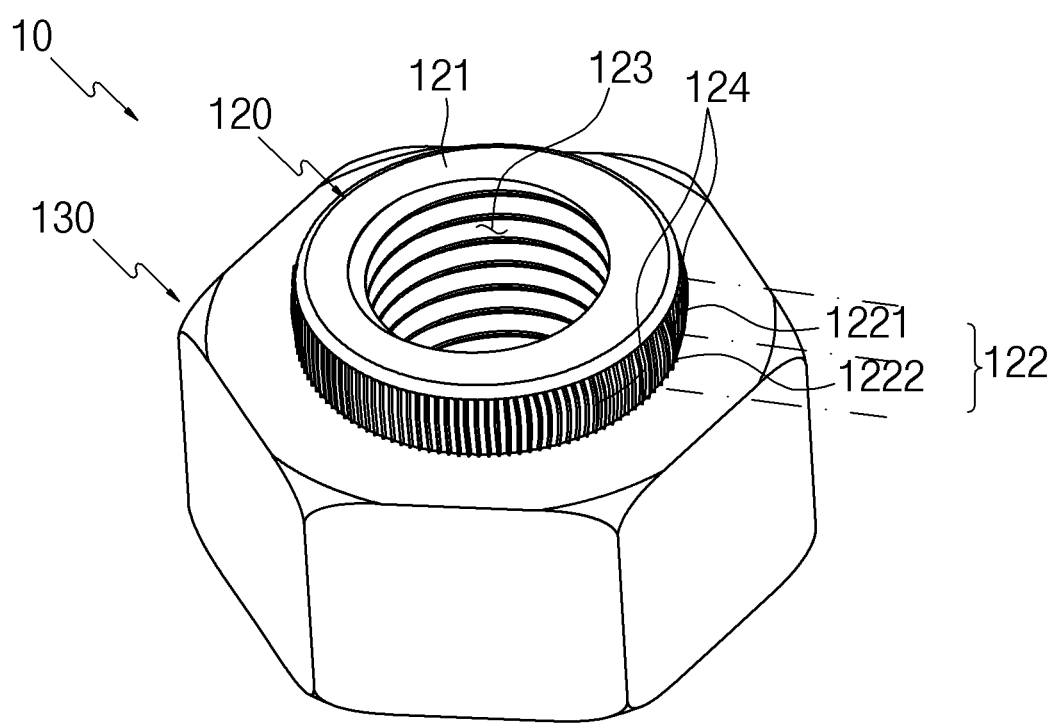
FIG. 17 is a perspective view showing the second embodiment of the press-fit nut.

In other words, since the front sector 1221 is formed to converge toward its center as it goes toward its end as shown in FIGS. 16 and 17, the press-fit part 120 is easily inserted into the base material M. So, it minimizes the brittle fracture of the base material M and makes the press-fit part 120 firmly inserted into the base material M at the same time. These two achievements looked so inconsistent with each other that they looked extremely difficult to achieve at the same time.

Further, in this case, the reduction rate at which the diameter of the front sector 1221 gradually decreases increases gradually as it goes from the boundary with the front sector 1221 and the rear sector 1222 or 1223 to the end of the front sector 1221. So, the surface of the front sector 1221 is curved in the longitudinal direction as shown in FIG. 16.

Therefore, the shape as described above is not only makes it easy to press-fit the press-fit nut 10 into the base material M, but also prevents the brittle fracture owing to its easy plastic deformation, and creates a strong resistance force in the withdrawal direction since it is firmly inserted into the base material M.

In addition, the front sector 1221 and the rear sector 1222 or 1223 are connected by a curved surface, so that they eventually create a continuous shape without any step in the entire section which is press-fitted into the base material M. This constitutive feature reduces the physical resistance when the clinching nut is press-fitted into the base material M.

And, as shown in FIGS. 18a and 18b, since the front sector 1221 decreases in a curved shape rather than linearly in its diameter as it goes towards its end which is the width in the horizontal direction, the front section of the press-fit part 120 receives the restoring force (RF) uniformly due to the curved shape of the front section of the press-fit part 120 when the part of the base material M that was pushed out during the press-fit part 120 was press-fitted into the base material M applies the restoring force (RF) to the press-fit part 120 after press-fitted. Accordingly, deformation damage of the press-fit part 120 is prevented because the restoring force (RF) is not concentrated on some part of the press-fit part 120.

Such deformation damage of the press-fit part 120 may cause the ridges formed in the hollow 123 at the center of the press-fit part 120 to be distorted, so that it may be going to make troubles when the stud bolt 20 is coupled with the ridges later.

The above-described problem is solved by making the front sector 1221 to decrease in curved shape in its diameter.

In addition, since the front sector 1221 decreases gradually in its diameter as it goes toward its end, it is easy to adapt to the tolerance of the press-fit hole formed in the base material M. It is excellent especially when used for very rigid building structures.

Two embodiments may be presented for the shapes of the rear sector 1222 or 1223.

The first embodiment for the shape of the rear sector 1222 or 1223 is as shown in FIGS. 15 and 16. The rear sector 1222 keeps its width constant from the boundary between the rear sector 1222 and the front sector 1221 towards the boundary between the rear sector 1222 and the head 130, that is, over the entire length of the rear sector 1222.

In this case, even if the width of the rear sector 1222 is kept constant, as described above, it is different from the conventional press-fit nut 10 in that the front sector 1221 converges to the center similar to a kind of bell shape in the present invention. The press-fit part 120 is press-fitted pushing the base material M laterally while the conventional press-fit nut 10 pushes in the base material M in the press-fit direction during the press-fitting process. So, the restoring force (RF) is applied laterally to the press-fit part 120, and the base material M firmly holds the outer circumferential surface of the rear sector 1222. Thus, the press-fit nut 10 according to the present invention can be firmly press-fitted and will not be loosened.

As shown in FIGS. 17, 18a and 18b, in the second embodiment for the shape of the rear sector, the rear sector 1223 decreases gradually in its diameter as it goes from the boundary between the front sector 1221 and the rear sector 1223 to the head 130.

In this second embodiment, the shape of the rear sector 1223 is similar to the inverted shape of the front sector 1221.

Figure 18:
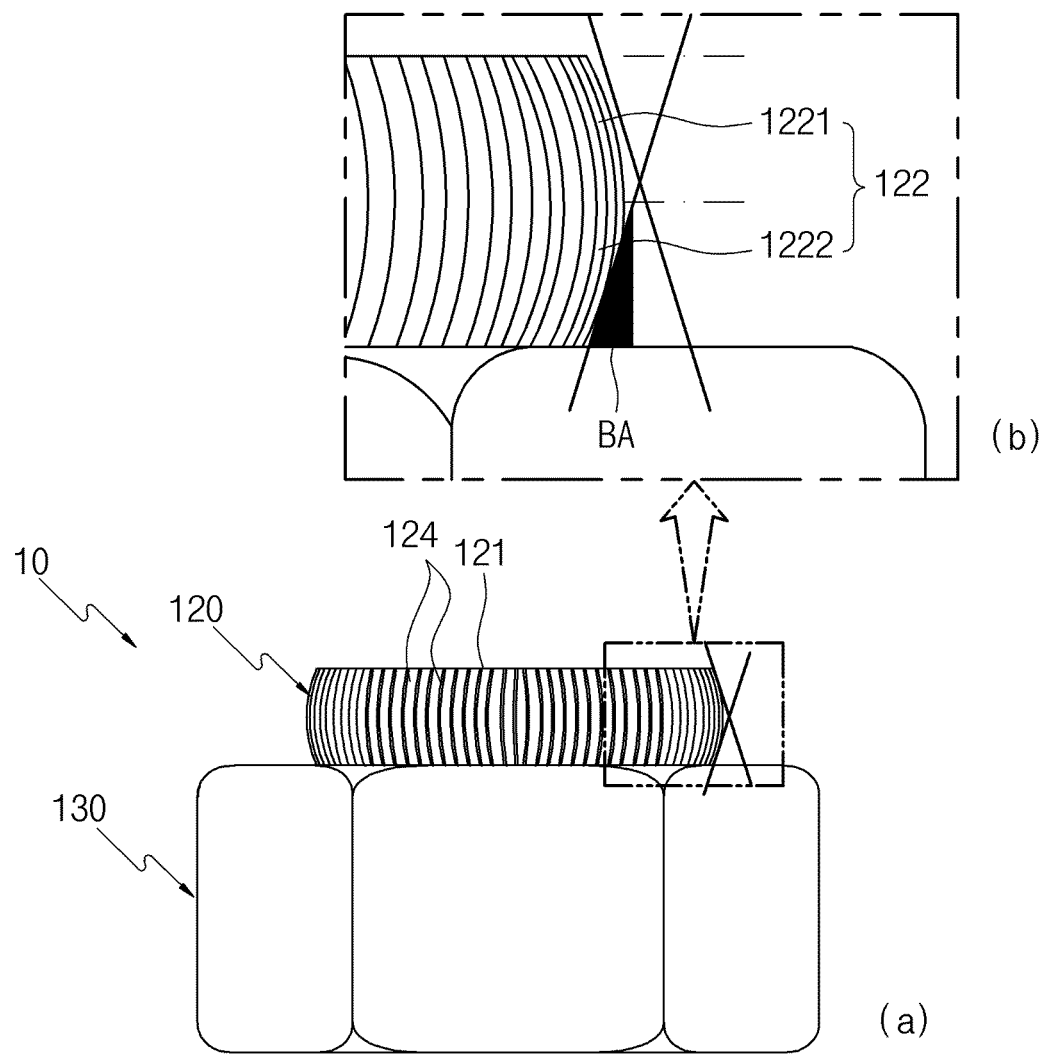
FIGS. 18a and 18b are a front view and an enlarged view showing the second embodiment of the press-fit nut, respectively.

In case that the rear sector 1223 is formed in the inverted shape of the front sector 1221, the restoration area BA shown in FIG. 18 is created after the rear sector 1223 is inserted into the base material M as shown in FIG. 18. The part of the base material M is momentarily pushed out to the side during the press-fit part 120 is inserted into the base material M. And then, the pushed part of the base material M wants to immediately return (restore) to the original position by a certain amount after the press-fit part 120 is completely inserted. So, the restoration area is created because of the restoring force of the pushed part after the press-fit part 120 is inserted into the base material M. Once the restoration area BA is created, it acts as an obstacle in the direction to pull the press-fit nut 10 out so that the press-fit nut 10 is firmly press-fitted into the base material M and cannot be not easily pulled out.

Figure 19:
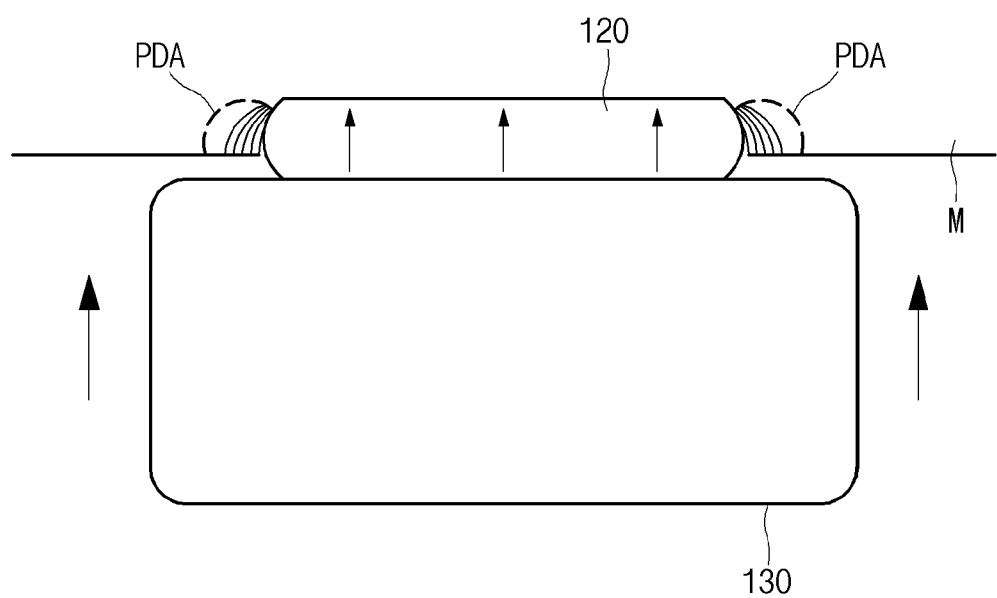
FIG. 19 is a conceptual view showing a press-fit nut according to the second embodiment shown in FIG. 17.
Figure 20:
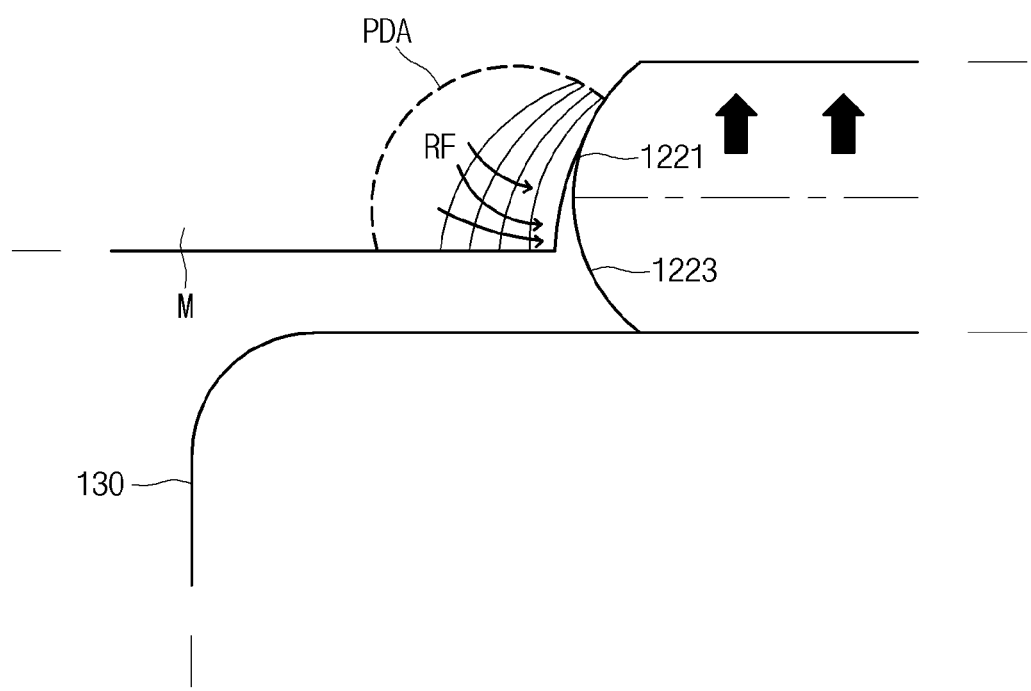
FIGS. 20 and 21 are enlarged views showing the press-fit nut after a predetermined time has elapsed from the state of FIG. 19.
Figure 21:
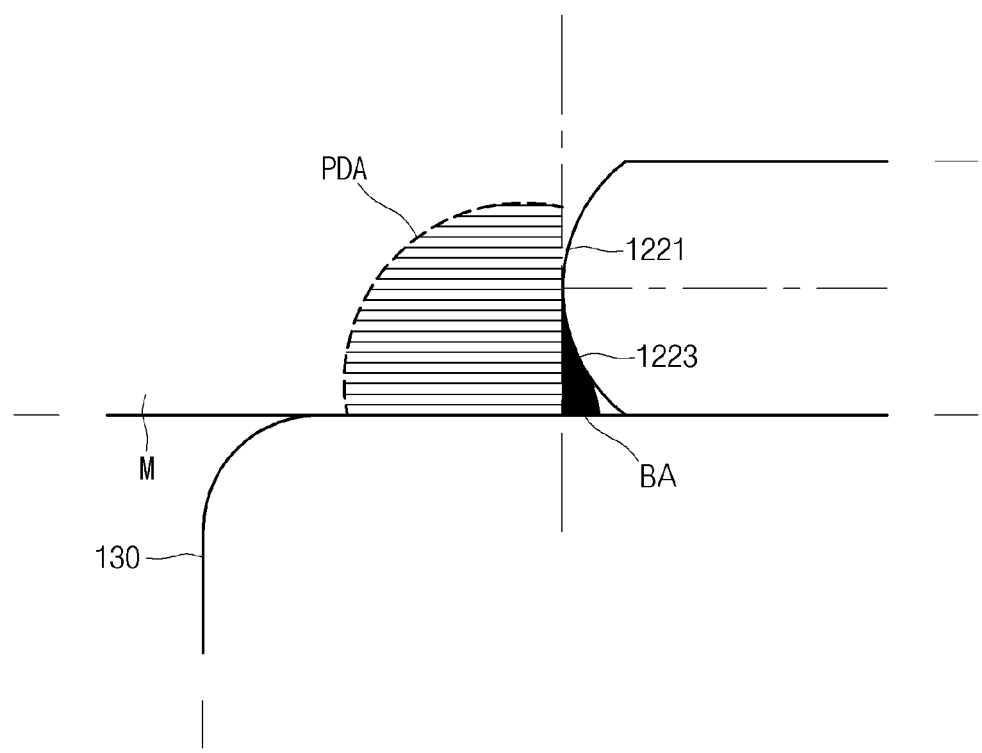

FIGS. 19 to 21 show more in detail.

FIG. 19 illustrates that the press-fit nut 10 is being press-fitted into the base material M. FIG. 20 is an enlarged view illustrating the left part of FIG. 19 in the situation shown in FIG. 19. FIG. 21 shows the part shown in FIG. 20 that has already been press-fitted into the base material M.

The front sector 1221 mainly pushes in the front and the side of the base material M as shown in F G. 20 when it is press-fitted. At this time, a local plastic deformation area (PDA) is created in the base material M due to the base material M that is pushed out to the side. The size of the plastic deformation area (PDA) may be either larger or smaller than that that shown in FIG. 20.

However, since the plastic deformation area (PDA) is instantaneously formed, only the part of the base material M is deformed permanently due to plastic deformation while the other part of the base material M is not deformed with complete plastic deformation but obtains a restoring force (RF) to return to its original position at the moment when the front sector 1221 pushes in the base material M.

The part without complete plastic deformation has a restoring force (RF) to return to its original position when the press-fit part 120 has been already completely press-fitted into the base material M as shown in FIG. 21. So, if the rear sector 1223 converges toward the center as it goes toward the head part 130, the press-fit part 120 is press-fitted as if it was gradually retracted from the boundary between the front sector 1221 and the rear sector 1223 in the viewpoint of the base material M. Thus, the base material M that was pushed out is pushed back into the space between the surface of the rear sector 1223 and the trajectory where the part of the press-fit part 120 which has the maximum diameter has passed.

The restoration area BA shown in FIGS. 18 and 21 is the part formed by the base material M which was pushed back in.

As described above, such a part formed by the base material M which was pushed back in becomes a restoration area BA that can act as a resistance force when the press-fit part 120 is pulled out of the base material M.

In addition, after it is press-fitted completely and the restoration area BA is formed, residual stress remains on the part of the base material M which is contacted with the boundary between the front sector 1221 and the rear sector 1223, so that the remained residual stress applies to the surfaces of the front sector 1221 and the rear sector 1223. However, since the front sector 1221 and the rear sector 1223 are connected to each other with a curved surface so as to evenly receive residual stress, it minimizes the chance that the press-fit unit 120 is locally deformed. And the press-fit unit 120 is more firmly coupled with the base material M.

In addition, since the plastic deformation area (PDA) shown in FIG. 21 contracts during the press-fitting process and then slightly recovered after the press-fitting process, work hardening happens as if it underwent vigorous cold working.

The work hardening phenomenon is one of the metal reinforcing mechanisms in which the strength of the metal increases due to the increased dislocation density caused by the entanglement or concentration of microdislocations that worked as the driving force of the deformation at the area which was deformed after the deformation processing of the metal.

Therefore, when work hardening happens at metals, their workability reduces but their strength increases, so that obtained is the most desirable physical properties required for the base material M around the press-fit nut 10 that was press-fitted. So, when the front sector 1221 and the rear sector 1223 are integrally formed in a round shape, resistance to residual stress is increased and plus, the part of the base material M at the deformation area which was pushed in between the rear sector 1223 and the head part 130 so to be restored is not deformed unless the press-fit nut 10 is pulled out with a force that is much greater than the force applied during the press-fitting process. Thus, the coupling between the press-fit nut 10 and the base material M is extremely effectively reinforced.

Therefore, even if the press-fit part 120 is not made in a wedge or hook shape, the press-fit part 120 is firmly positioned. However, if the press-fit part 120 is manufactured in a wedge shape or a hook shape instead of the shape of the front section 1221 and the rear section 1223 according the present invention, the ridges of the internal hollow 123 can be deformed since the press-fit part 120 is vulnerable to residual stress because of its shape.

In addition, the reduction rate at which the diameter of the rear sector 1223 is gradually decreased may be equal to or greater than the reduction rate at which the diameter of the front sector 1221 is gradually decreased.

In particular, when the reduction rate at which the diameter of the rear sector 1223 gradually decreases is greater than the reduction rate at which the diameter of the front sector 1221 gradually decreases, the restoration area BA may incompletely fill the space between the rear sector 1223 and the head unit 130 as shown in FIG. 21. In this case, the residual stress applying the part between the rear sector 1223 and the head 130 is reduced and the press-fit part 120 is firmly fixed and does not move due to the restoration area BA.

Figure 23:
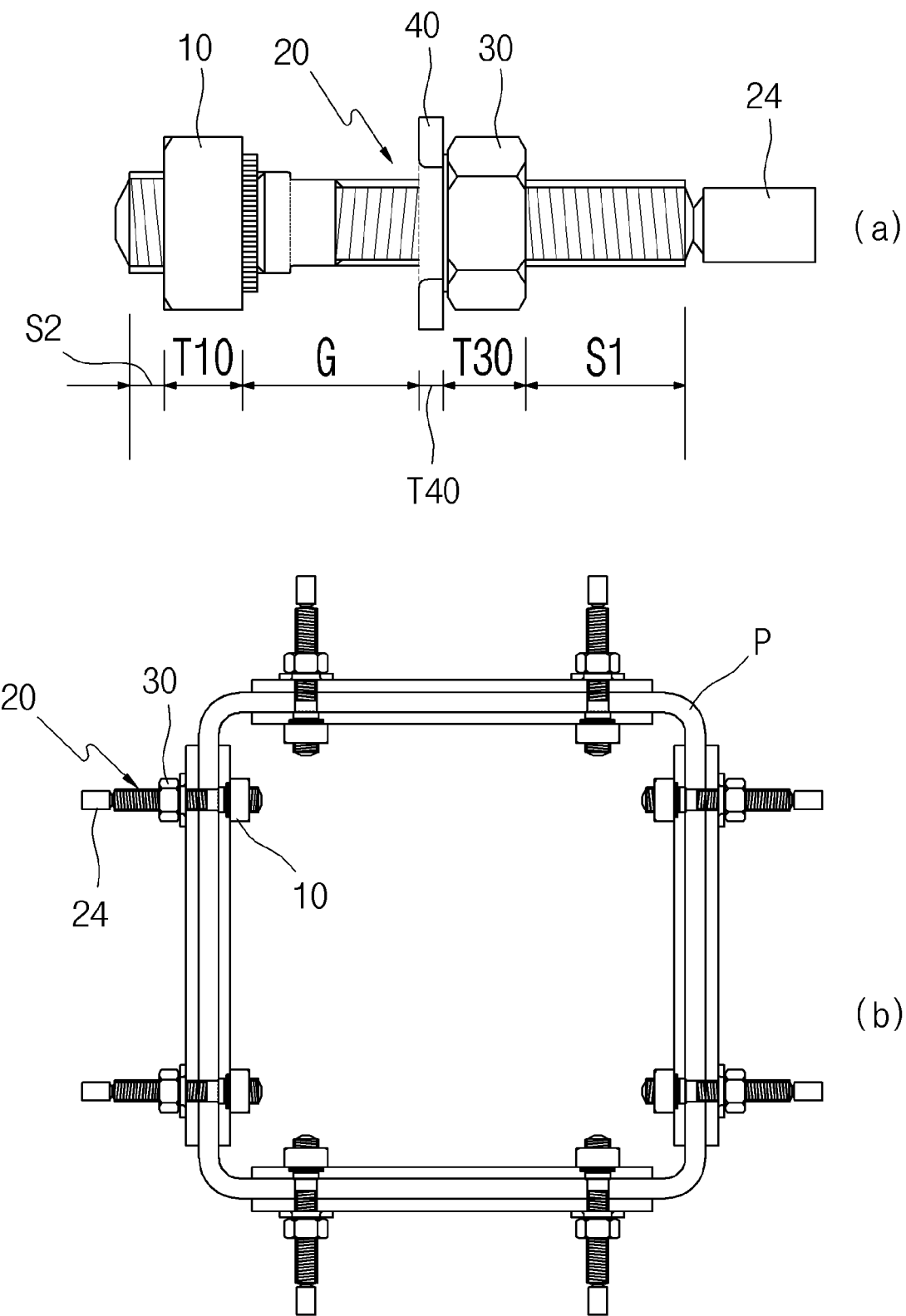
FIGS. 23a and 23b show an embodiment of a steel-concrete structure construction using the press-fit nut-bolt assembly shown in FIG. 7.
Figure 24:
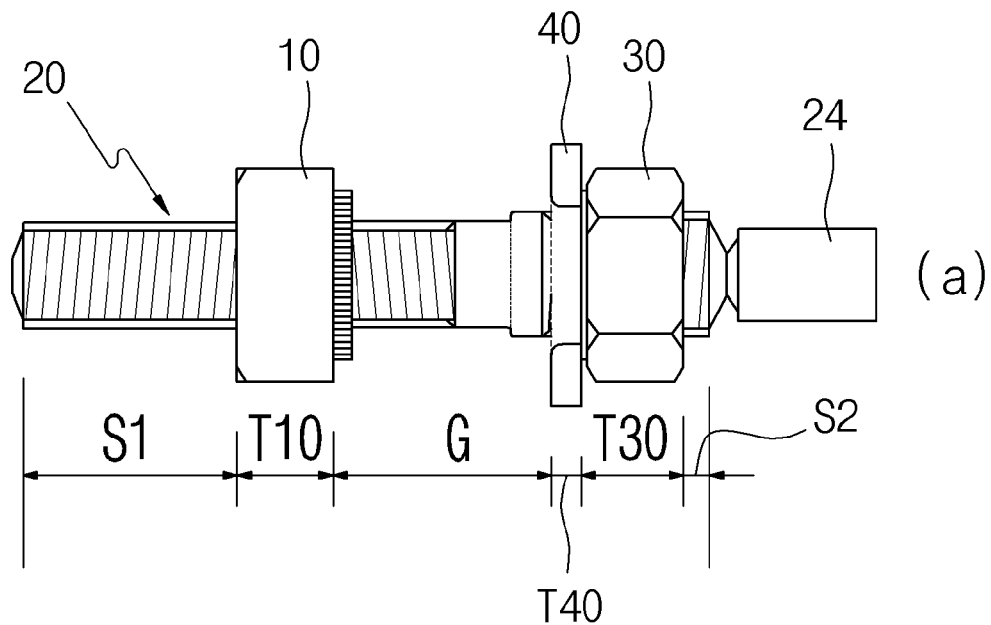
FIGS. 24a and 24b show a modified embodiment shown in FIG. 23.
Figure 24:
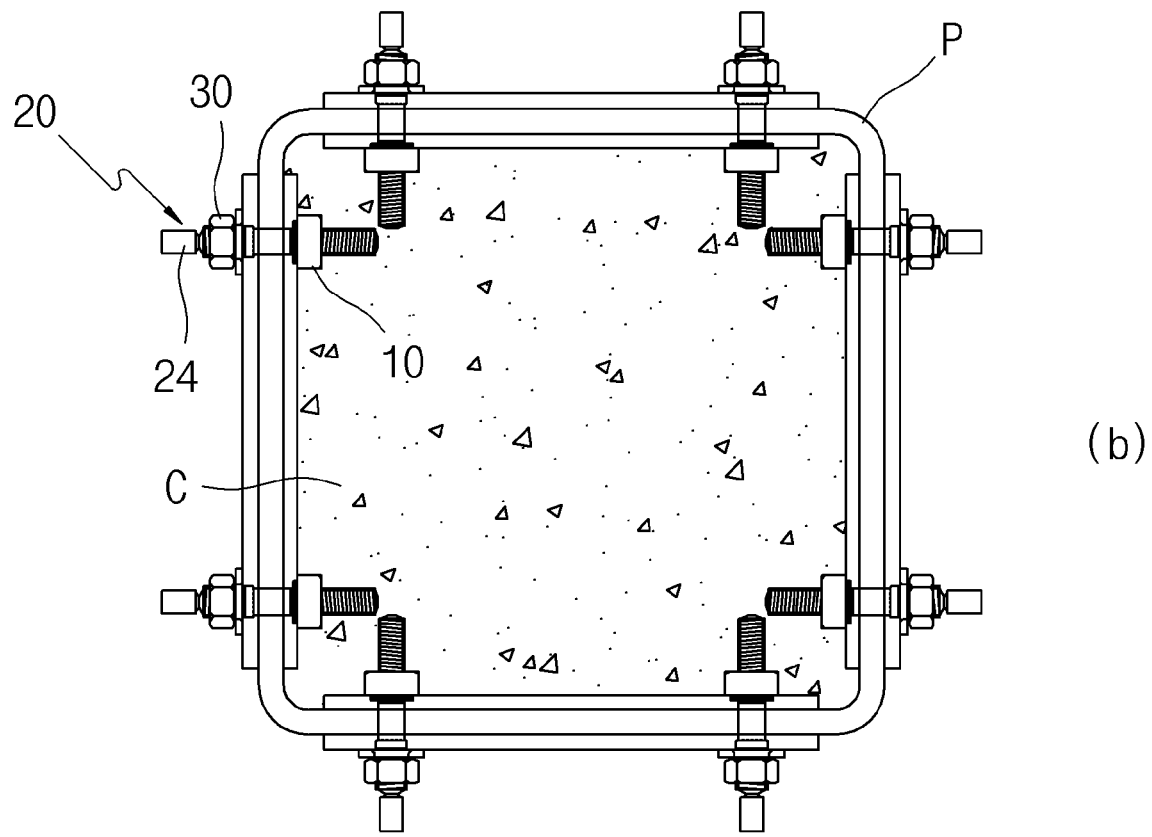

On the other hand, as shown in FIGS. 23a and 24a, the stud bolt 20 can be manufactured to be as long as the sum of a grip area G, the press-fit nut thickness T10, the counter nut thickness T30, and the washer thickness T40 and additionally the sum of the first surplus section S1 and the second surplus section S2 of predetermined lengths.

Figure 22:
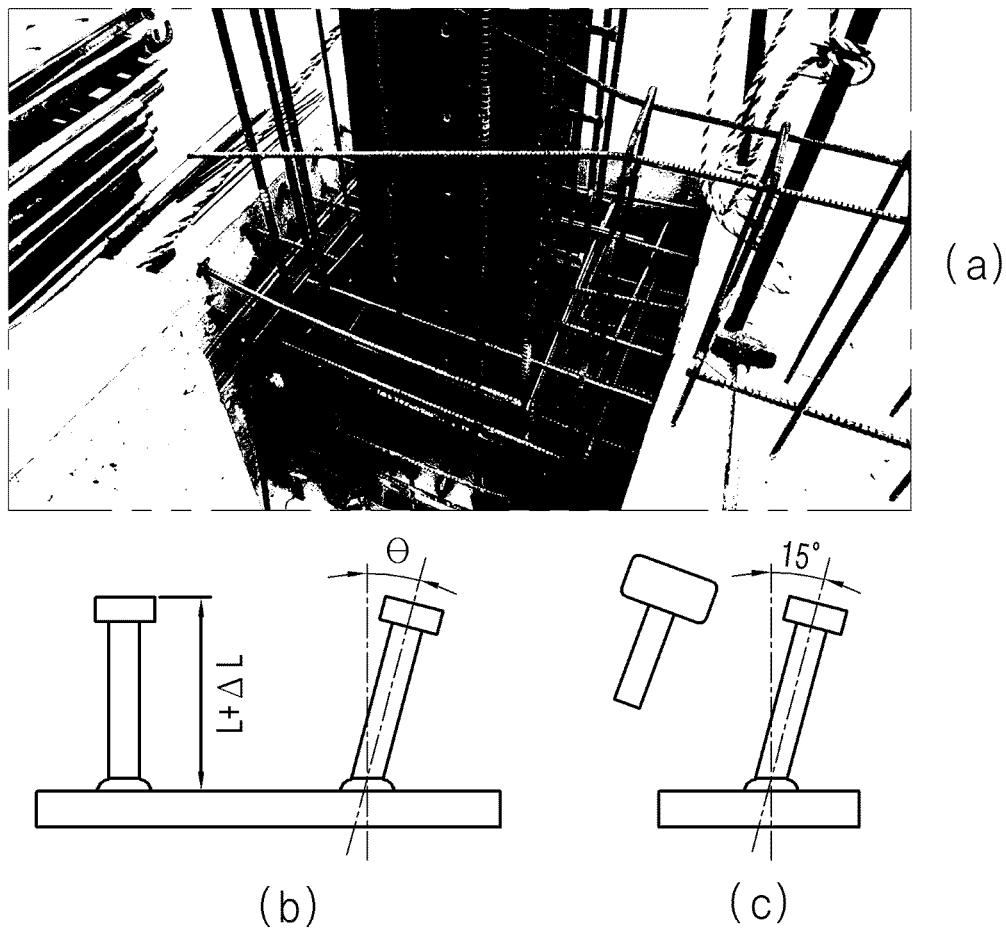
FIGS. 22a to 22c are a photograph of construction and two conceptual views showing the conventional bolt welding method, respectively.

Conventionally, in the construction of a structure in which steel and concrete are bonded, concrete is poured after stud bolts are joined to the steel by welding as shown in FIGS. 22a and 22b in order to increase the bonding strength between the steel and the concrete. As a result, the stud bolts have the larger contact area with the concrete so as to act similar to a kind of steel frame.

However, in the case of fixing the stud bolt by welding as shown in conceptual views of FIGS. 22b and 22c, the welding part may be damaged by pressure during the pouring process of concrete, and it may be broken unexpectedly after curing due to residual stress. In particular, if it is broken after curing, a sudden decrease in the integrity of the structure may increase the risk of serious safety accidents.

However, in the embodiment shown in FIGS. 23b and 24b, the first and second surplus sections S1 and S2 are provided. One of the first and second surplus sections S1 and S2 acts as if the bolts installed by conventional welding enhance adhesion to concrete. The other one acts as a margin length so that the counter nut 30 coupled to the opposite side is not easily loosened.

Such an action of increasing the adhesion of concrete by the stud bolts can be applied not only to H-shaped steel or built-up square steel pipes shown in the photograph of FIG. 22a, but also to ERW-shape or SAW-type square steel pipes, so that it can also be applied to various concrete filling columns (CFT).

At this time, the determination of the first surplus section S1 and the second surplus section S2, i.e., the determination of the extent to which the stud bolts 20 are inserted into the square steel pipe or beyond the steel plate can be made before the concrete is cured.

Figure 25:
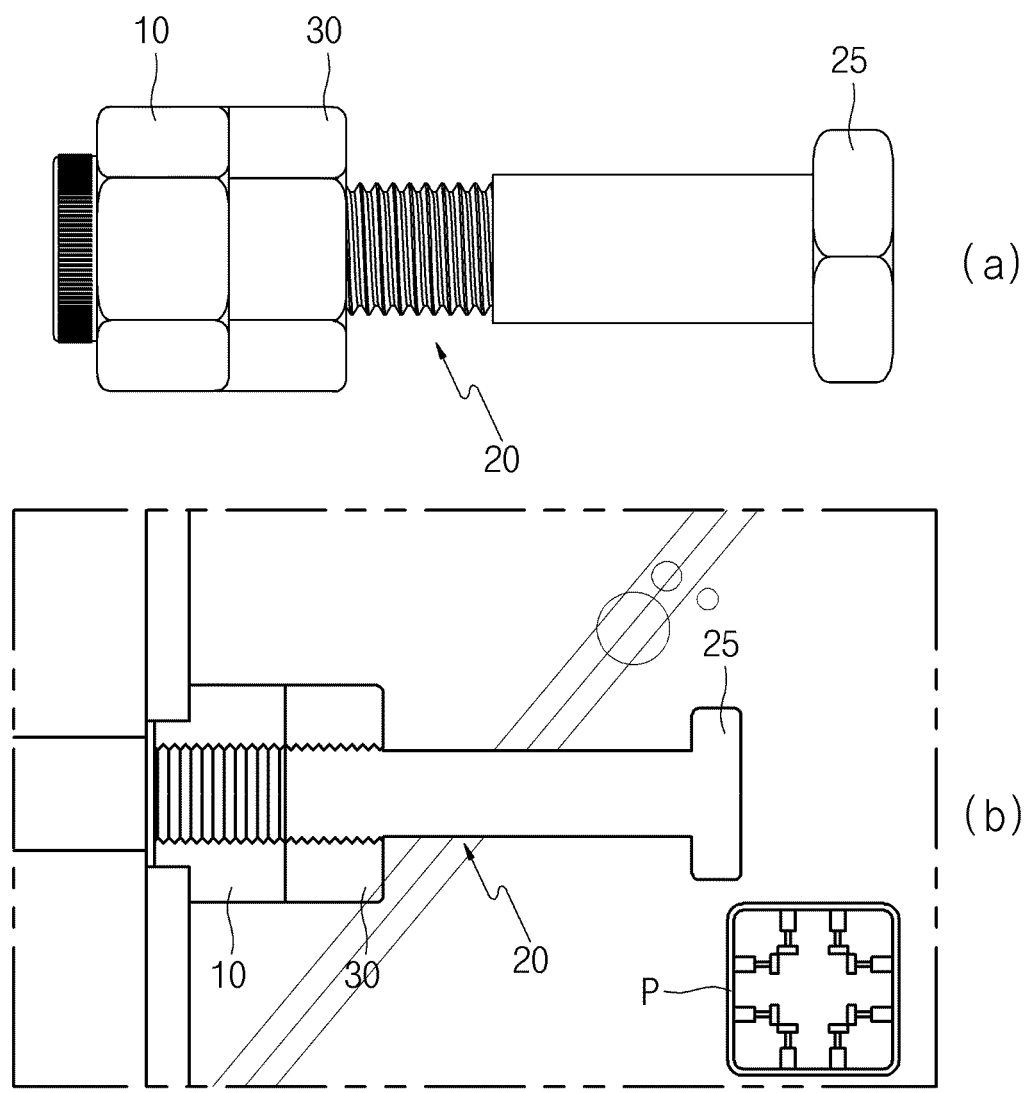
FIGS. 25a and 25b are conceptual views showing another modified embodiment shown in FIG. 23.

Alternatively, it may be configured according to the modified embodiment as shown in FIG. 25.

As shown in FIG. 25, a bolt head 25 may be formed at the end of the first or second surplus sections S1 or S2, that is, at the end of the stud bolt 20, and the bolt head 25 is disposed where it will be buried in concrete, so that the bonding strength between the concrete and the stud bolt 20 and steel can be improved.

The press-fit nut 10 and the counter nut 30 are not installed with a steel material therebetween as shown in FIG. 24b, but may be installed in close contact with each other as shown in FIG. 25. At this time, the counter nut 30 prevents the stud bolt 20 from bending due to stress transmitted from the concrete. And, the press-fit nut 10 prevents the counter nut 30 from tilting. So, as a whole, they interact with each other so that the press-fit nut-bolt assembly can be firmly installed and fixed.

The first surplus section S1 and the second surplus section S2 are formed at one end and the other of the stud bolt 20 respectively to face each other as shown in FIG. 24a.

On the other hand, a method for constructing a steel-concrete composite structure using the above-described press-fit nut-bolt assembly will be briefly described since it mostly overlaps with the above-described description.

The method for constructing a steel-concrete composite structure using the press-fit nut-bolt assembly includes steps of: perforating so as to insert the stud bolt 20 into a steel material; press-fitting the press-fit nut 10 so as to form a concentric circle with the hole formed by the perforation in the area where the perforation is made on the surface of the steel material to be bonded to concrete; installing the stud bolt 20, the counter nut 30, and the washer 40 to the press-fit nut 10; pouring the concrete on the surface to be bonded; and adjusting the installation position of the stud bolt 20 before curing the concrete so as to maximize the length of one of the first surplus section S1 and the second surplus section S2, which is buried in the concrete, wherein there is no temporal precedence between the step of pouring concrete and the step of adjusting to maximize the length.

Here, in the step of installing the stud bolt 20, the counter nut 30, and the washer 40, a stud bolt 20 having a bolt head 25 formed at its end is preferably used, and the stud bolt 20 is installed so as to dispose the bolt head 25 on the side of the steel material which the concrete is bonded to, and the counter nut 30 is installed in close contact with the outer surface of the press-fit nut 10.

The technical idea described above is not limited by the embodiments and the accompanying drawings. It will be obvious for those who have common knowledge in the technical field to which the present technical idea belongs that various substitutions, modifications and changes are possible within the scope not departing from the above technical idea.

The invention claimed is:

1. A press-fit nut-bolt assembly having a press-fit nut, a stud bolt, a counter nut, and a washer, wherein the press-fit nut comprises:

a head part formed in a normal nut shape; and a press-fit part formed to extend from one of both sides of the head part and having an outer diameter of the head part reduced as it extends, and is inserted by press-fitting into a base material M which requires fastening, wherein the head part and the press-fit part have a hollow with ridges continuously formed therein, wherein the stud bolt includes:

a body part penetrating the press-fit nut so as to be coupled with the press-fit nut; and a pin tail formed to extend from the end of the body part and coupled with a mechanism for rotating the body part, wherein the body part includes a first ridge part and a second ridge part which are formed on an outer surface of the body part along the length direction of the body part and formed to be spaced apart from each other, wherein the counter nut is disposed on the opposite side of the press-fit nut with the base material therebetween which the stud bolt penetrates so that the stud bolt penetrates the counter nut so as to be coupled with the counter nut, wherein the washer is disposed between the base material and the counter nut, and the stud bolt penetrate its center, wherein the pin tail is formed at an end of the second ridge part which is one of both ends of the body part, so that the press-fit nut is coupled with the first ridge part and the counter nut is coupled to the second ridge part, and the first ridge part and the second ridge part are opposite to each other in directions of their ridges, and wherein the pin tail has a pin groove formed at an end thereof, and an assembly pin corresponding to a shape of the pin groove is coupled with the pin groove, so that the press-fit nut and the counter nut are fastened in a direction approaching each other by rotating a connector.

2. A press-fit nut-bolt assembly having a press-fit nut, a stud bolt, a counter nut, and a washer, wherein the press-fit nut comprises:

a head part formed in a normal nut shape; and a press-fit part formed to extend from one of both sides of the head part and having an outer diameter of the head part reduced as it extends, and is inserted by press-fitting into a base material M which requires fastening, wherein the head part and the press-fit part have a hollow with ridges continuously formed therein, wherein the stud bolt includes:

a body part penetrating the press-fit nut so as to be coupled with the press-fit nut; and a pin tail formed to extend from the end of the body part and coupled with a mechanism for rotating the body part, wherein the body part includes a first ridge part and a second ridge part which are formed on an outer surface of the body part along the length direction of the body part and formed to be spaced apart from each other, wherein the counter nut is disposed on the opposite side of the press-fit nut with the base material therebetween which the stud bolt penetrates so that the stud bolt penetrates the counter nut so as to be coupled with the counter nut, wherein the washer is disposed between the base material and the counter nut, and the stud bolt penetrate its center, wherein the pin tail is formed at an end of the second ridge part which is one of both ends of the body part, so that the press-fit nut is coupled with the first ridge part and the counter nut is coupled to the second ridge part, and the first ridge part and the second ridge part are opposite to each other in directions of their ridges, and wherein the pin tail has a polygonal protruding pin formed at its center, and is further provided with a connector having an assembly groove formed thereon that is matching the protruding pin, so that the connector coupled with the protruding pin can be rotated so as to install the stud bolt stably.

3. A press-fit nut-bolt assembly having a press-fit nut, a stud bolt, a counter nut, and a washer, wherein the press-fit nut comprises:

a head part formed in a normal nut shape; and a press-fit part formed to extend from one of both sides of the head part and having an outer diameter of the head part reduced as it extends, and is inserted by press-fitting into a base material M which requires fastening, wherein the head part and the press-fit part have a hollow with ridges continuously formed therein, wherein the stud bolt includes:

a body part penetrating the press-fit nut so as to be coupled with the press-fit nut; and a pin tail formed to extend from the end of the body part and coupled with a mechanism for rotating the body part, wherein the body part includes a first ridge part and a second ridge part which are formed on an outer surface of the body part along the length direction of the body part and formed to be spaced apart from each other, wherein the counter nut is disposed on the opposite side of the press-fit nut with the base material therebetween which the stud bolt penetrates so that the stud bolt penetrates the counter nut so as to be coupled with the counter nut, wherein the washer is disposed between the base material and the counter nut, and the stud bolt penetrate its center, wherein the pin tail is formed at an end of the second ridge part which is one of both ends of the body part, so that the press-fit nut is coupled with the first ridge part and the counter nut is coupled to the second ridge part, and the first ridge part and the second ridge part are opposite to each other in directions of their ridges, wherein the press-fit nut-bolt assembly further comprises a press-fit ring that is a ring-shaped member and press-fitted to a surface of the base material, the other surface of which the press-fit part is inserted into, and wherein the press-fit ring deforms the surface of the base material as much as the other surface of the base material which the press-fit part is press-fitted into to deform lest the base material should be twisted and bent due to an excessive deformation of the other surface of the base material.

4. A method for constructing a steel-concrete composite structure using a press-fit nut-bolt assembly having a press-fit nut, a stud bolt, a counter nut, and a washer, wherein the press-fit nut comprises:

a head part formed in a normal nut shape; and a press-fit part formed to extend from one of both sides of the head part and having an outer diameter of the head part reduced as it extends, and is inserted by press-fitting into a base material M which requires fastening, wherein the head part and the press-fit part have a hollow with ridges continuously formed therein, wherein the stud bolt includes:

a body part penetrating the press-fit nut so as to be coupled with the press-fit nut; and a pin tail formed to extend from the end of the body part and coupled with a mechanism for rotating the body part, wherein the body part includes a first ridge part and a second ridge part which are formed on an outer surface of the body part along the length direction of the body part and formed to be spaced apart from each other, wherein the counter nut is disposed on the opposite side of the press-fit nut with the base material therebetween which the stud bolt penetrates so that the stud bolt penetrates the counter nut so as to be coupled with the counter nut, wherein the washer is disposed between the base material and the counter nut, and the stud bolt penetrate its center, wherein the pin tail is formed at an end of the second ridge part which is one of both ends of the body part, so that the press-fit nut is coupled with the first ridge part and the counter nut is coupled to the second ridge part, and the first ridge part and the second ridge part are opposite to each other in directions of their ridges, wherein the stud bolt is as long as a sum of a grip area that is an entire thickness of the base material to be combined with the stud bolt, a press-fit nut thickness, a counter nut thickness, and a washer thickness, and additionally a sum of the first surplus section and the second surplus section of predetermined lengths, wherein the first surplus section and the second surplus section are formed at one end and the other end of the stud bolt respectively, and wherein the method includes steps of:

perforating so as to insert the stud bolt into the steel material;

press-fitting the press-fit nut so as to form a concentric circle with a hole formed by the perforation in the area where the perforation is made on a surface of the steel material to be bonded to concrete;

installing the stud bolt, the counter nut, and the washer to the press-fit nut;

pouring the concrete on the surface to be bonded; and adjusting the installation position of the stud bolt before curing the concrete so as to maximize the length of one of the first surplus section and the second surplus section, which is buried in the concrete, wherein there is no temporal precedence between the step of pouring concrete and the step of adjusting to maximize the length.

5. The method for constructing a steel-concrete composite structure of claim 4, wherein in the step of installing the stud bolt, the counter nut, and the washer, a stud bolt having a head formed at its end is used, the stud bolt is installed so as to dispose the bolt head on the side of the steel material which the concrete is bonded to, and the counter nut is installed in close contact with the outer surface of the press-fit nut.

6. A press-fit nut comprises:

a head part formed in a normal nut shape such as a polygonal column or a circular column, and having ridges on an inner surface of a hollow that penetrates between both sides thereof; and a press-fit part extending from one of both sides of the head part with decreasing in diameter, wherein the press-fit part has:

a hollow at a center of the press-fit part, which continues to the hollow of the head part; and plate-shaped splines on a circumferential side of the press-fit part, which are aligned parallel in the protruding direction and closely to each other with predetermined interval, wherein the press-fit part includes:

a front sector which is a portion between an end and a certain point; and a rear sector which is a portion between the certain point and a point in contact with the head part, wherein the splines are formed continuously in length direction from the front sector to the rear sector, wherein the front sector decreases in its diameter as it goes from a boundary with the front sector and the rear sector to an end of the front sector, and converges toward its center.

7. The press-fit nut of claim 6, wherein a reduction rate at which the diameter of the front sector gradually decreases increases gradually as it goes from the boundary with the front sector and the rear sector to a end of the front sector so that a surface of the front sector is curved in a longitudinal direction.

8. The press-fit nut of claim 7, wherein the rear sector has the same cross-sectional diameter over the entire length of the rear sector.

9. The press-fit nut of claim 7, wherein the rear sector gradually decreases in its cross-sectional diameter as it goes from the boundary between the front sector and the rear sector to the head part and converges toward its center.

10. The press-fit nut of claim 9, wherein a reduction rate at which the diameter of the rear sector gradually decreases increases gradually as it goes from the boundary between the front sector and the rear sector to a boundary between the head part and the rear sector so that a surface of the rear sector is curved in a longitudinal direction.

11. The press-fit nut of claim 10, wherein the front sector and the rear sector are connected with each other by a curved surface.

12. The press-fit nut of claim 10, wherein the reduction rate at which the diameter of the rear sector gradually decreases is greater than or equal to the reduction rate at which the diameter of the front sector gradually decreases.

* * * * *